United States Patent

Suzuki et al.

[11] Patent Number: 5,964,315
[45] Date of Patent: Oct. 12, 1999

[54] POWER STEERING APPARATUS

[75] Inventors: Katsuhiro Suzuki; Shinichi Hagidaira; Yoshiyuki Tsukada, all of Kani; Masashi Takai, Minokamo, all of Japan

[73] Assignee: Kayaba Industry Co., Ltd., Tokyo, Japan

[21] Appl. No.: 08/897,735

[22] Filed: Jul. 21, 1997

[30] Foreign Application Priority Data

| Aug. 2, 1996 | [JP] | Japan | 8-220309 |
| Nov. 18, 1996 | [JP] | Japan | 8-322248 |
| Feb. 28, 1997 | [JP] | Japan | 9-062014 |
| Mar. 24, 1997 | [JP] | Japan | 9-088849 |
| May 21, 1997 | [JP] | Japan | 9-147208 |
| Jun. 3, 1997 | [JP] | Japan | 9-160432 |

[51] Int. Cl.$^6$ .................................................. B62D 5/08
[52] U.S. Cl. .......................................... 180/441; 91/375 A
[58] Field of Search .................................... 180/441, 417, 180/421, 422, 423; 91/375 A

[56] References Cited

U.S. PATENT DOCUMENTS

| 5,251,669 | 10/1993 | Bishop | 91/375 A |
| 5,667,034 | 9/1997 | Jones et al. | 180/422 |
| 5,707,049 | 1/1998 | Dodak | 180/441 |
| 5,851,006 | 12/1998 | Spillner et al. | 91/375 A |

FOREIGN PATENT DOCUMENTS

| 3139470 | 6/1991 | Japan . |
| 6171520 | 6/1994 | Japan . |

*Primary Examiner*—Kevin Hurley
*Attorney, Agent, or Firm*—Steinberg & Raskin, P.C.

[57] ABSTRACT

An object of the present invention is to provide a power steering apparatus in which its neutral rigidity can be raised by applying a preset force and which is superior in its assembly performance and productivity.

To attain this object, first supporting portions are formed in a pair of spring members disposed across the input shaft, and second supporting portions are formed in the input shaft so as to oppose the first supporting portions. When the input shaft and the output shaft are rotated relative to each other so that the balls or rollers are about to slip out of the first and second supporting portions, the balls or rollers roll and move while deflecting the spring members.

21 Claims, 16 Drawing Sheets

POWER STEERING APPARATUS

BACKGROUND OF THE INVENTION

1. Field of the Invention

This invention relates to a power steering apparatus utilizing a torsion bar.

2. Description of the Prior Art

In a conventional power steering apparatus utilizing a torsion bar, as a factor of feeling from a steering wheel, torsion resistance provided by this torsion bar can be utilized.

When the steering wheel is in its neutral position, there occurs little torsion resistance in the torsion bar, therefore its neutral rigidity becomes weak so that its stability at the time of straight traveling of a vehicle worsens.

Thus, various types of apparatuses for enhancing the neutral rigidity by applying a preset force have been proposed. For example, apparatuses disclosed in Japanese Patent Application Laid-Open No.Hei6-171520 and Hei3-139470 have been well known since before.

In a power steering apparatus disclosed in Japanese Patent Application Laid-Open No.Hei6-171520, an input shaft is inserted into an output shaft so that a space is formed between both the shafts and a ring-shaped spring is incorporated in this space. This spring is formed by cutting one position of the material and can be opened to the right and left from that cut position. Then, pins of the input shaft side and the output shaft side are protruded and the respective pins are inserted into the cut positions of the above spring members.

If the input shaft and the output shaft are rotated relative to each other with the above condition, the ring-shaped spring members are opened from the cut positions. Thus, reaction of the spring acts as a preset force to enhance neutral rigidity.

In a power steering apparatus disclosed in Japanese Patent Application Laid-Open No.Hei3-139470, the input shaft is inserted into the output shaft and protrusions are formed on portions opposing each other of both the shafts. Leaf springs are applied in such a condition that they nip these protrusions.

If both the input shaft and the output shaft are rotated relative to each other, the spring force of the leaf spring acts as a preset force because the phase of those protrusions are contradictory to each other, so that the neutral rigidity is enhanced.

However, in the power steering apparatus disclosed in the above Japanese Patent Application Laid-Open No.Hei6-171520, its preset force is difficult to specify.

For example, if it is intended to increase the preset force, a deflection of the ring-shaped spring member at the initial setting must be increased. However, if the ring-shaped spring member is in largely deflected state, its fitting performance is worsened.

If it is intended to decrease the deflection of the ring-shaped spring member at the time of initial setting in order to improve the fitting performance, the spring constant must be increased in proportional therewith. However, if the spring constant is increased, stress in the spring is increased in proportional therewith. Thus, there sometimes occurs a case in which the spring is destroyed even in ordinary application range.

In a power steering apparatus disclosed in Japanese Patent Application Laid-Open No.Hei3-139470, if the protrusions on both the shafts are not set symmetrically, the preset forces are dispersed so that looseness may occur. If it is intended to arrange them symmetrically to prevent such a phenomenon, quite high an accuracy is needed and therefore productivity of this product drops.

SUMMARY OF THE INVENTION

Accordingly, an object of the present invention is to provide a power steering apparatus capable of enhancing its neutral rigidity by applying a preset force and excellent in assembly performance and productivity.

The present invention is premised on a power steering apparatus comprising an input shaft connected to a steering wheel, an output shaft connected to wheels and a torsion bar connecting the input shaft and the output shaft, wherein the input shaft and the output shaft are rotated relative to each other while twisting the torsion bar so as to apply an assist force corresponding to an amount of the relative rotation.

According to a first aspect of the invention, there is provided a power steering apparatus further comprising a pair of spring members disposed in the output shaft or a member rotating integrally with the output shaft so as to sandwich the input shaft, first supporting portions formed in the spring members, second supporting portions formed on an external circumference of the input shaft so as to oppose the first supporting portions when the input shaft and the output shaft are in neutral position, and balls or rollers disposed between the first and second supporting portions which oppose each other, wherein when the input shaft and the output shaft are rotated relative to each other so that the balls or rollers are about to slip out of the first and second supporting portions, the balls or rollers roll and move between the first and second supporting portions while deflecting the spring members.

According to a second aspect of the invention, there is provided a power steering apparatus according to the first aspect wherein the balls or rollers slipping out of the first and second supporting portions roll and move between the spring members and the external circumference of the input shaft while deflecting the spring members.

According to a third aspect of the present invention, there is provided a power steering apparatus according to the second aspect wherein a rolling surface continuous from the second supporting portion is formed on both sides of the second supporting portion formed on an external circumference of the input shaft while the rolling surface being a plane which does not coincide with a circular face formed around an axis of the input shaft, and when the input shaft and the output shaft are rotated relative to each other, the ball or roller slipping out of the first and second supporting portions rolls and moves on the rolling surface while twisting the spring member, a force of the spring member at a contact point between the roller and the rolling surface generating a component force in the same direction as or opposite direction to a rotation direction of the input shaft.

According to a fourth aspect of the present invention, there is provided a power steering apparatus according to the third aspect wherein the rolling surfaces are flat faces.

According to a fifth aspect of the present invention, there is provided a power steering apparatus according to the second–fourth aspect wherein a pair of stoppers are formed on each of the spring members such that when the input shaft and the output shaft are rotated by a predetermined amount relative to each other, the balls or rollers make a contact with the stoppers.

According to a sixth aspect of the present invention, there is provided a power steering apparatus according to the first–fifth aspect wherein the spring member is formed of a leaf spring comprising a first supporting portion of V-shaped groove or U-shaped groove, a pair of flat portions or slope portions continuous with the first supporting portion, a pair of convex portions continuous with ends of the flat portions or slope portions, a pair of supporting leg portions continuous with the convex portions, and a pair of hooking portions continuous with ends of the supporting leg portions, wherein the balls or rollers slipping out of the first and second supporting portions roll and move between the flat portions or the slope portions and the external circumference of the input shaft while deflecting the leaf spring.

According to a seventh aspect of the present invention, there is provided a power steering apparatus according to the first–sixth aspect wherein the spring member is formed of a leaf spring comprising a pair of slope portions continuous while forming a valley portion, a pair of convex portions continuous with ends of the slope portions, a pair of supporting leg portions continuous with the convex portions, and a pair of hooking portions continuous with ends of the supporting leg portions, wherein the valley portion acts as a first supporting portion and the balls or rollers slipping out of the first and second supporting portions roll and move between the slope portions and the external circumference of the input shaft while deflecting the leaf spring.

According to an eighth aspect of the present invention, there is provided a power steering apparatus according to the sixth or seventh aspect wherein a spring storing chamber is provided in the output shaft or a member rotating integrally with the output shaft and the leaf springs are stored in the spring storing chamber and secured therein by making the hooking portions thereof in firm contact with wall faces.

According to a ninth aspect of the present invention, there is provided a power steering apparatus according to the first–fifth aspect comprising sheet-shaped elastic members as spring members, wherein fixing portions are provided on both ends of the sheet-shaped elastic members and the fixing portions are fixed to the output shaft or a member rotating integrally with the output shaft by fixing means the position of which is not changed.

According to a tenth aspect of the present invention, there is provided a power steering apparatus according to the ninth aspect wherein the sheet-shaped elastic member comprises the leaf spring and a cam in which the first supporting portion is formed.

BRIEF DESCRIPTION OF THE DRAWINGS

FIG. 10 is an enlarged sectional view of the spring storing chamber of the power steering apparatus according to the fifth embodiment.

FIG. 11 is an enlarged view of the leaf spring composing the spring member according to the fifth embodiment.

FIG. 14 is a view showing a state in which sheet-shaped elastic members according to the seventh embodiment are installed.

FIG. 15 is an enlarged view of a leaf spring as the sheet-shaped elastic member according to the seventh embodiment.

FIG. 17 is a view showing a state in which the sheet-shaped elastic members according to the eighth embodiment are installed.

FIG. 18 is a view showing a state in which sheet-shaped elastic members according to a ninth embodiment are installed, indicating an example in which leaf springs and cams are utilized as the sheet-shaped elastic members.

FIG. 20 is a view showing a state in which the sheet-shaped elastic members according to the tenth embodiment are installed on the fixing ring 50.

FIG. 21 is a view showing a state in which the sheet-shaped elastic members according to an eleventh embodiment are installed on the fixing ring 50, indicating an example in which the leaf springs and the cams are utilized as the sheet-shaped elastic members.

DETAILED DESCRIPTION OF THE PREFERRED EMBODIMENTS

FIGS. 1–5 show a power steering apparatus according to a first embodiment of the present invention.

Figure 1:
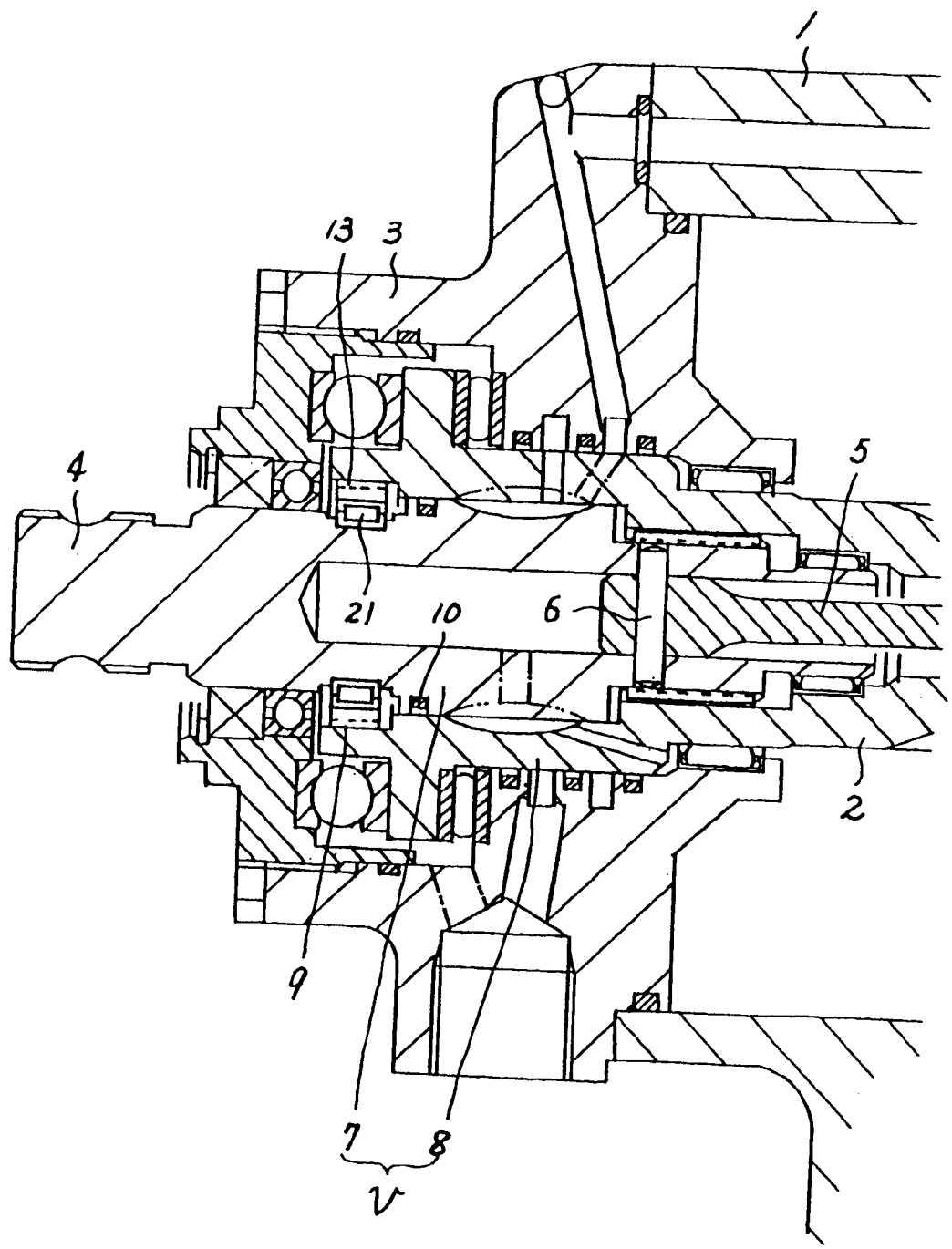
FIG. 1 is a sectional view of a power steering apparatus according to a first embodiment.

In a power steering apparatus of integral type shown in FIG. 1, a piston (not shown) is incorporated in a power cylinder 1 such that this piston runs through an output shaft 2. The piston and the output shaft 2 are interconnected with each other through a ball nut (not shown).

A sector gear (not shown) meshes with the piston such that the sector gear is rotated with a traveling of the piston.

A valve case 3 is fixed to the above power cylinder 1. The valve case 3 supports a proximal end of the output shaft 2 so that it is freely rotatable.

An interior of the output shaft 2 is hallow and an end of the input shaft 4 is rotatably inserted into the proximal end thereof.

The input shaft 4 and the output shaft 2 are connected with each other through a torsion bar 5. That is, an end of the torsion bar 5 is inserted into the input shaft 4 and the torsion bar is fixed by means of a pin 6 going through the inserted portion. The other end of the torsion bar 5 is fixed to the output shaft 2 by means of a pin (not shown).

Therefore, the input shaft 4 and the output shaft 2 are rotated relative to each other while the torsion bar 5 is twisted.

A rotary spool 7 is formed on an external circumference of the input shaft 4 which is inserted into the output shaft 2. Further, a rotary sleeve 8 is formed on an internal circumference of the output shaft 2 facing this rotary spool 7. Then, the rotary spool 7 and the rotary sleeve 8 are engaged with each other such that they are relatively rotatable, thereby forming a steering valve v.

Now, if the input shaft 4 and the output shaft 2 are rotated relative to each other, the steering valve v is switched depending on the rotation direction, so that hydraulic oil is supplied to a pressure chamber sectioned in the power cylinder 1 and hydraulic oil in the other pressure chamber is discharged. As a result, the piston is moved so as to rotate the sector gear thereby applying an assist force to wheels interconnected therewith.

In the power steering apparatus having such a structure, a spring storing chamber 9 is formed at an end of the output shaft 2 and separated from the steering valve v by means of a sealing member 10.

Figure 2:
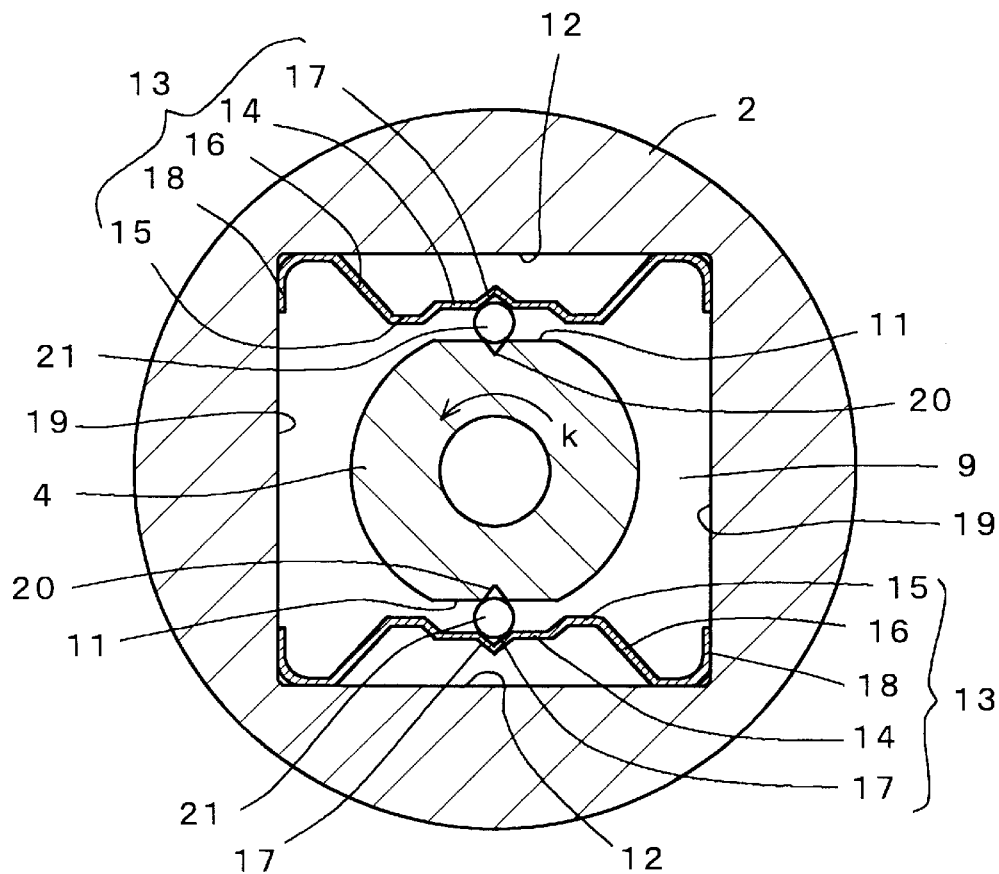
FIG. 2 is a sectional view of a spring storing chamber of the power steering apparatus according to the first embodiment.

As shown in FIG. 2, the spring storing chamber 9 is formed by excavating an end portion of the output shaft 2 in substantially square shape.

An input shaft 4 is inserted into the spring storing chamber 9 and a pair of spring members 13 are disposed so as to sandwich the input shaft 4. A ball or roller 21 is disposed between each of the spring members 13 and each of the input shafts 4.

A pair of flat faces 11 are formed on an external circumference of the above input shaft 4. Then, the flat faces 11 are made to oppose the wall faces 12 of the spring storing chamber 9, and in such a neutral condition in which the input shaft 4 and the output shaft 2 are not rotated relative to each other, the flat faces 11 and the wall faces 12 are kept in parallel to each other.

Further, second supporting portions 20 of V-shaped groove or U-shaped groove are formed in the flat faces 11 so that the balls or rollers 21 are supported by the second supporting portions 20.

Figure 3:
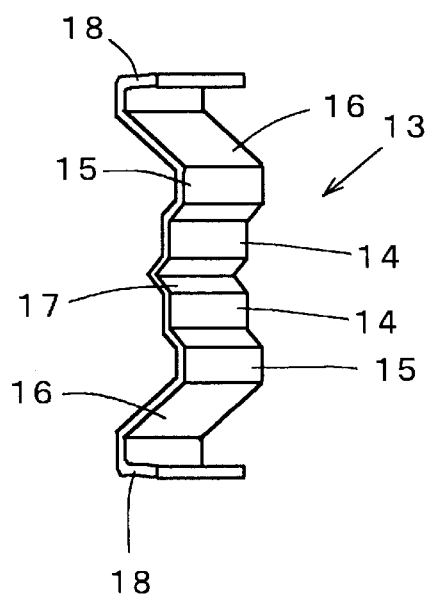
FIG. 3 is a perspective view of a leaf spring composing the spring member according to the first embodiment.

As shown in FIG. 3, the above spring member 13 is a leaf spring comprising a V-shaped or U-shaped supporting portion 17, flat portions 14 continuous therewith on both sides of this first supporting portion, a pair of convex portions 15 continuous therewith on ends of the flat portions 14, a pair of supporting leg portions 16 continuous with the convex portions 15 and a pair of hooking portions 18 continuous with ends of the supporting leg portions 16.

The above convex portions 15 function as a stopper for preventing the ball or roller 21 from slipping out of between the spring member 13 and the input shaft 4 when the ball or roller goes beyond the first and second supporting portions 17, 20.

When the above spring member 13 is free, a distance between the hooking portions 18, 18 of both sides is longer than a width of the wall face 12 of the spring storing chamber 9.

Thus, when the spring member 13 is stored in the spring storing chamber 9 as shown in FIG. 2, the spring member 13 is compressed so that the hooking portions 18 thereof are made to firmly contact the wall faces 12 and wall faces 19 perpendicular to the wall faces 12 at the corner portions of the spring storing chamber 9 to secure the spring member 13.

Then, in the neutral condition in which the input shaft 4 and the output shaft 2 are not rotated relative to each other, the above second supporting portions 20 are made to oppose the first supporting portions 17 in the spring members 13. When the spring members 13 are secured, the distance between the first supporting portion 17 and the second supporting portion 20 becomes smaller than when the ball or roller 21 is disposed.

Then, if the ball or roller 21 is disposed between the first and second supporting portions 17, 20, a spring force directing toward the center of the input shaft 4 is generated so that this spring force serves as an initial load.

If the ball or roller 21 slips out of the above first and second supporting portions 17, 20, it rolls on the flat faces 11 extending on both sides of the second supporting portion 20. In the present embodiment, the flat faces 11 serve as rolling surfaces.

An operation of the power steering apparatus according to the first embodiment will be described below.

Now if the steering wheel is kept at its neutral position, the input shaft 4 and the output shaft 2 stay in the neutral condition shown in FIG. 2. The initial load of the above spring member 13 is applied to the input shaft 4 through the ball or roller 21 as a preset force.

Thus, it is possible to enhance the neutral rigidity and secure stability of straight travelling.

At the neutral position, the distance between the first supporting portion 17 and the second supporting portion 20 only has to be large enough to hold the ball or roller 21 even if the above initial load is not produced. In such a case as well, if the input shaft 4 is about to rotate relative to the output shaft 2 so that the ball or roller 21 is about to move, the neutral rigidity can be enhanced by a spring force of the spring member 13. The spring force at this time serves as the preset force.

Assume that the steering wheel is turned from this state, so that the input shaft 4 is rotated, for example, in the direction of an arrow k relative to the output shaft 2.

Figure 4:
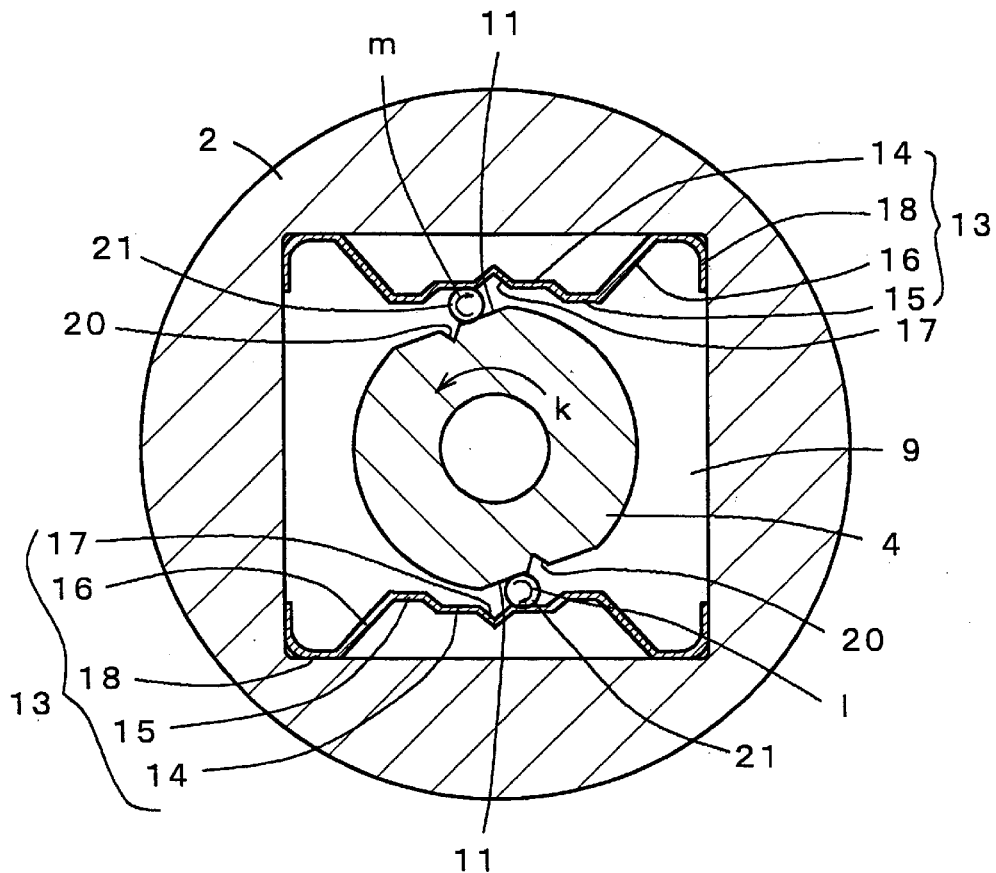
FIG. 4 is a sectional view showing a state in which the input shaft and the output shaft are rotated relative to each other in FIG. 2.

At this time, as shown in FIG. 4, the ball or roller 21 rolls while deflecting the spring member 13 so that it slips out of the first and second supporting portions 17, 20.

Then, if the input shaft 4 and the output shaft 2 are further rotated relative to each other, the ball or roller 21 rolls and moves in the direction of the arrow m between the flat portion 14 of the spring member 13 and the flat face 11 of the input shaft 4 while deflecting the spring member 13.

Figure 5:
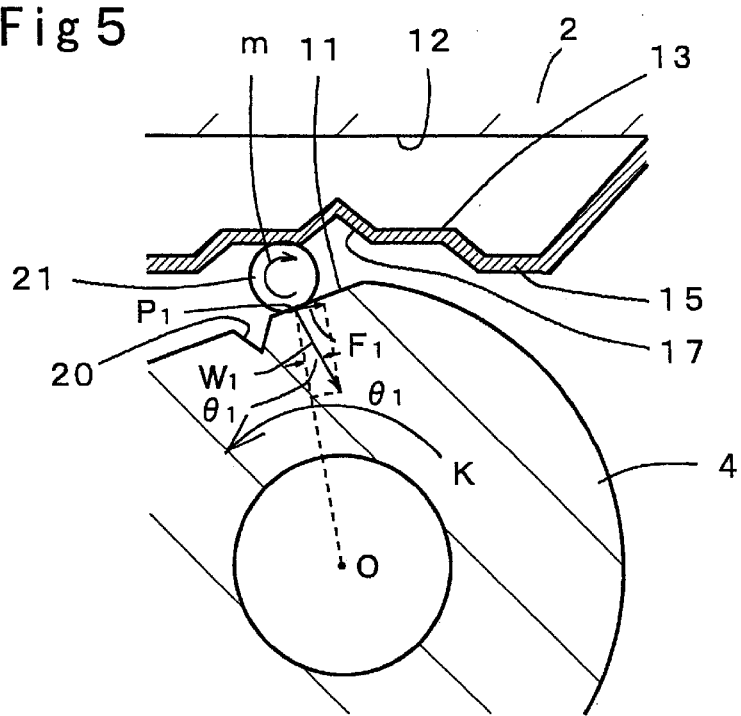
FIG. 5 is a partially enlarged view of FIG. 4.

FIG. 5 is an enlarged view showing a rolling surface in which the ball or roller 21 rolls at this time. Referring to FIG. 5, a spring force $W_1$ perpendicular to a flat face 11 acts on a contact point $P_1$ between the ball or roller 21 and the flat face 11 which is the rolling surface. The direction of this spring force $W_1$ is deviated from a direction directing to the center O of the input shaft 4. This is because the rolling surface is not a circular surface formed around an axis of the input shaft 4 but the flat face 11. Thus, it is found that this spring force $W_1$ has a component force $F_1 = W_1 \cdot \sin\theta_1$ in rotation direction.

This component force $F_1$ is a force opposite to the rotation direction k of the input shaft 4, that is, a force of the same direction as steering resistance. Meanwhile, the component in the rotation direction, namely, a component force of such a direction that it is synthesized with the steering resistance is called spring component force.

Thus, the steering resistance at this time is a synthesis of torsional resistance of the torsion bar 5 and the spring component force $F_1$ of the spring member 13. That is, by generating the spring component force $F_1$, the steering resistance produced when the input shaft 4 and the output shaft 2 are rotated relative to each other can be changed.

When the input shaft 4 and the output shaft 2 are rotated relative to each other while generating such a steering resistance so that an amount of that relative rotation becomes maximum, the ball or roller 21 contacts a convex portion 15 of the spring member 13. Thus, the convex portion 15 functions as a stopper thereby preventing the ball or roller 21 from slipping out of between the flat portion 14 of the spring member 13 and the flat face 11 of the input shaft 4.

When the input shaft 4 and the output shaft 2 are rotated relative to each other, as described previously, the steering valve v is switched so as to control hydraulic oil in the power cylinder 1 thereby applying an assist force. Then, if the wheels are steered up to a desired value because the assist force is applied, the input shaft 4 and the output shaft 2 are returned to the neutral condition. At this time, the balls or rollers 21 are returned to the positions of the first and second supporting portions 17, 20 while rolling in an opposite direction so that the neutral condition shown in FIG. 2 is regained.

In the power steering apparatus according to the first embodiment, the neutral rigidity is raised by applying the preset force so that the stability of straight travelling of a vehicle can be obtained.

Because the spring members 13 are disposed on both sides of the input shaft 4 to apply the preset force, the preset force can be balanced. Thus, the neutral rigidity does not differ depending on a direction in which the steering wheel is steered.

Further, the above spring members 13 do not have to fit to protrusions of the input shaft unlike the conventional example and can be incorporated in the spring storing chamber 9 separately from the input shaft 4. Thus, its assembly performance can be improved.

Further, the preset force can be adjusted by not only the spring force of the spring member 13 but also a length of the flat face 11 of the input shaft 4, a diameter of the ball or roller 21 or the like easily.

Because when the input shaft 4 and the output shaft 2 are rotated relative to each other, the balls or rollers 21 roll and move between the flat portions 14 of the spring members 13 and the flat faces 11 of the input shaft 4, the friction at that time can be reduced. Thus, the characteristic between the input torque of the steering wheel and relative rotation amount between both the shafts can be smoothed.

Further, the steering resistance can be adjusted by the spring component force $F_1$.

Because the spring component force $F_1$ is $F_1 = \sin\theta_1 \cdot W_1$ as shown in FIG. 5, the spring component force $F_1$ can be adjusted by changing $\theta_1$ or $W_1$. The $\theta_1$ or $W_1$ changes depending on the relative rotation amount of the input shaft 4, a shape of the rolling surface, a spring constant or shape of the spring member or the like.

Meanwhile, the shape of the spring member 13 is not restricted to the above first embodiment.

Figure 6:
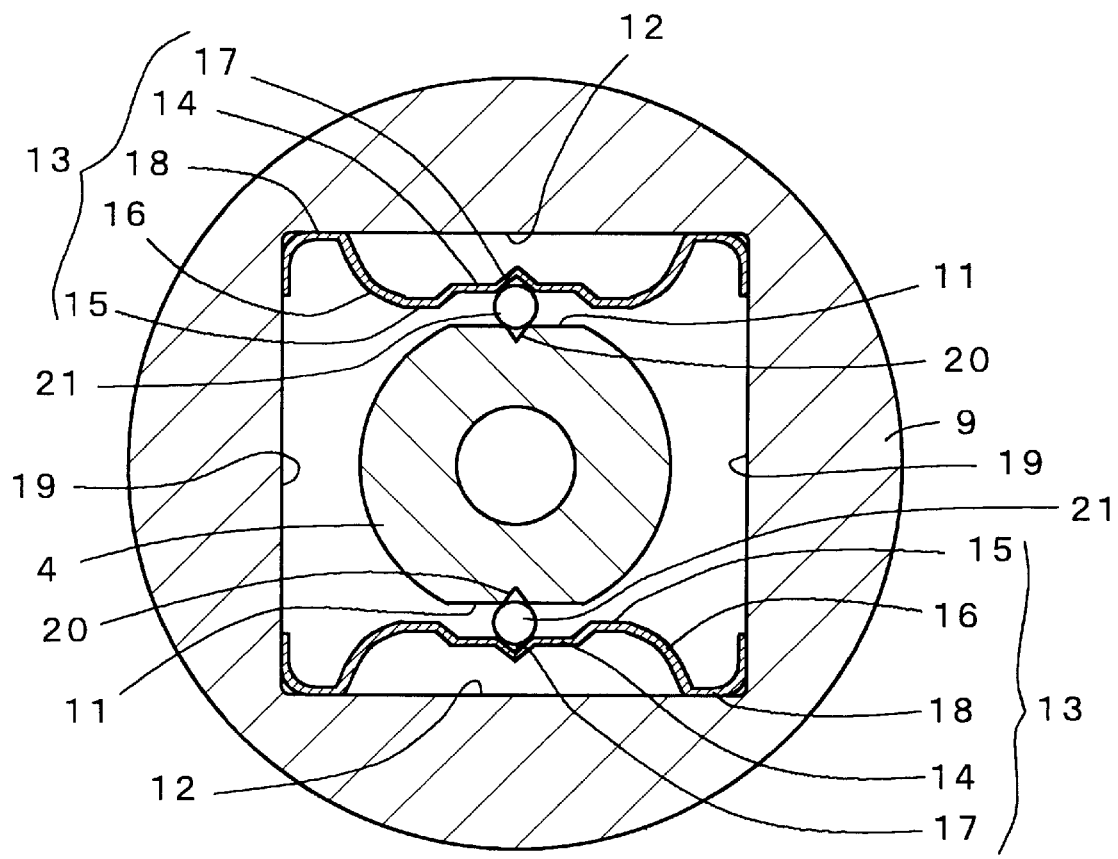
FIG. 6 is a sectional view of the spring storing chamber of the power steering apparatus according to a second embodiment.

For example, in a second embodiment shown in FIG. 6, supporting leg portions 16 of a leaf spring composing the spring member 13 apply a curved shape. However, the other composition and features are completely the same as the first embodiment. Thus, the same reference numerals are attached to the same components and a description thereof in detail is omitted.

Figure 7:
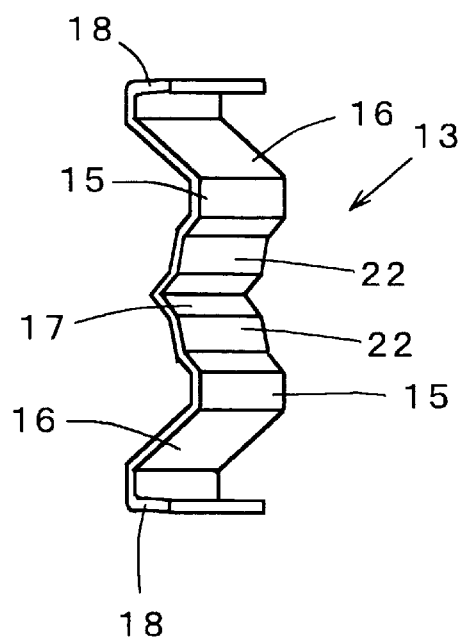
FIG. 7 is a perspective view of the leaf spring used in the power steering apparatus according to a third embodiment.

In a third embodiment shown in FIG. 7, the flat portions 14 in the leaf spring composing the spring member 13 have been changed to slope portions 22. However, the other composition and features are completely the same as the above first embodiment. Thus, the same reference numerals are attached to the same components and a description thereof in detail is omitted.

If a surface on which the ball or roller 21 rolls is the slope portion 22 like the third embodiment, an angle formed by a portion of the slope portion 22 continuous to the first supporting portion 17 or the convex portion 15 is larger than an angle formed on both sides of the flat portion 14 in the first embodiment. If the angle of such a continuous portion is set large, concentration of stress is not likely to occur at that portion, so that the durability of the spring member 13 is raised and the reliability of the power steering apparatus can be improved.

Figure 8:
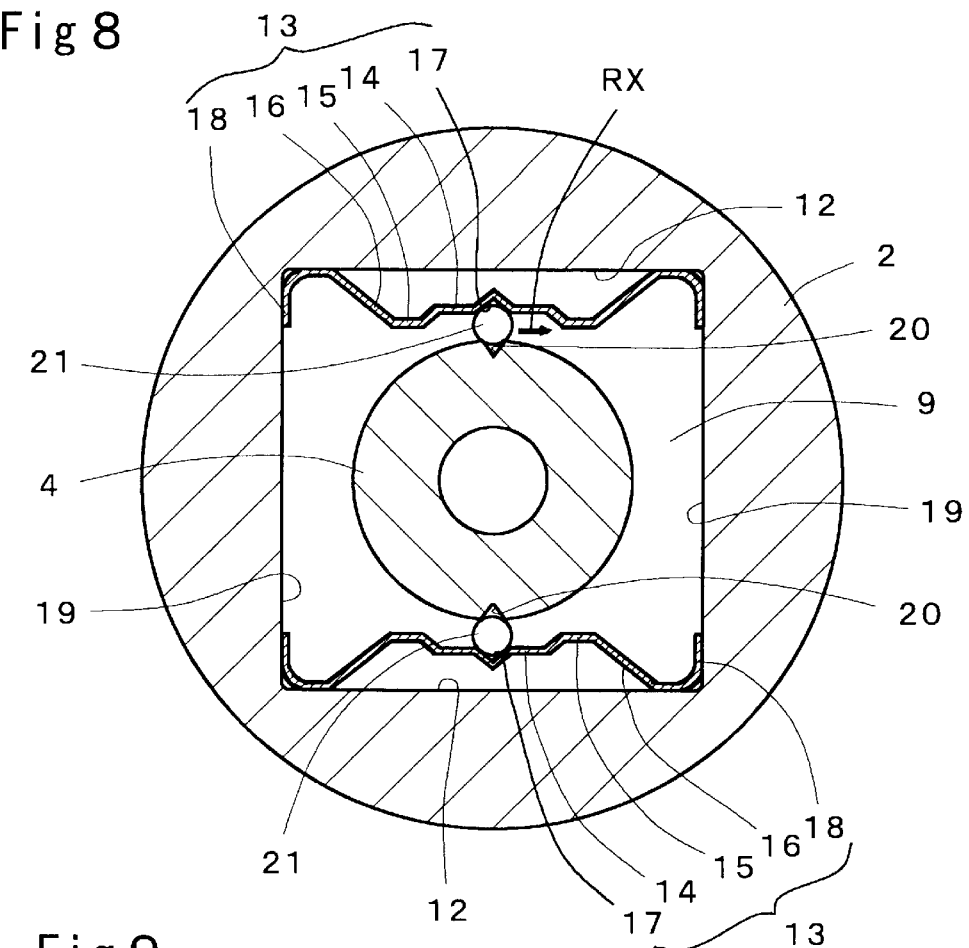
FIG. 8 is a sectional view of the spring storing chamber of the power steering apparatus according to a fourth embodiment.
Figure 9:
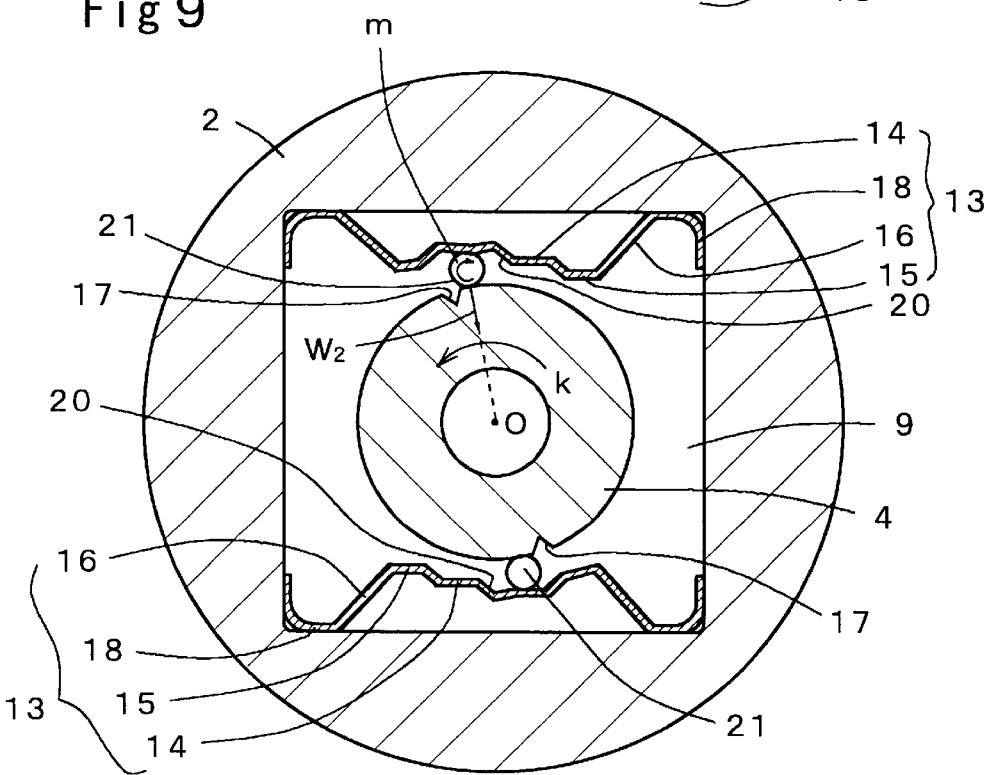
FIG. 9 is a sectional view showing a state in which the input shaft and the output shaft are rotated relative to each other in FIG. 8.
Figure 1:
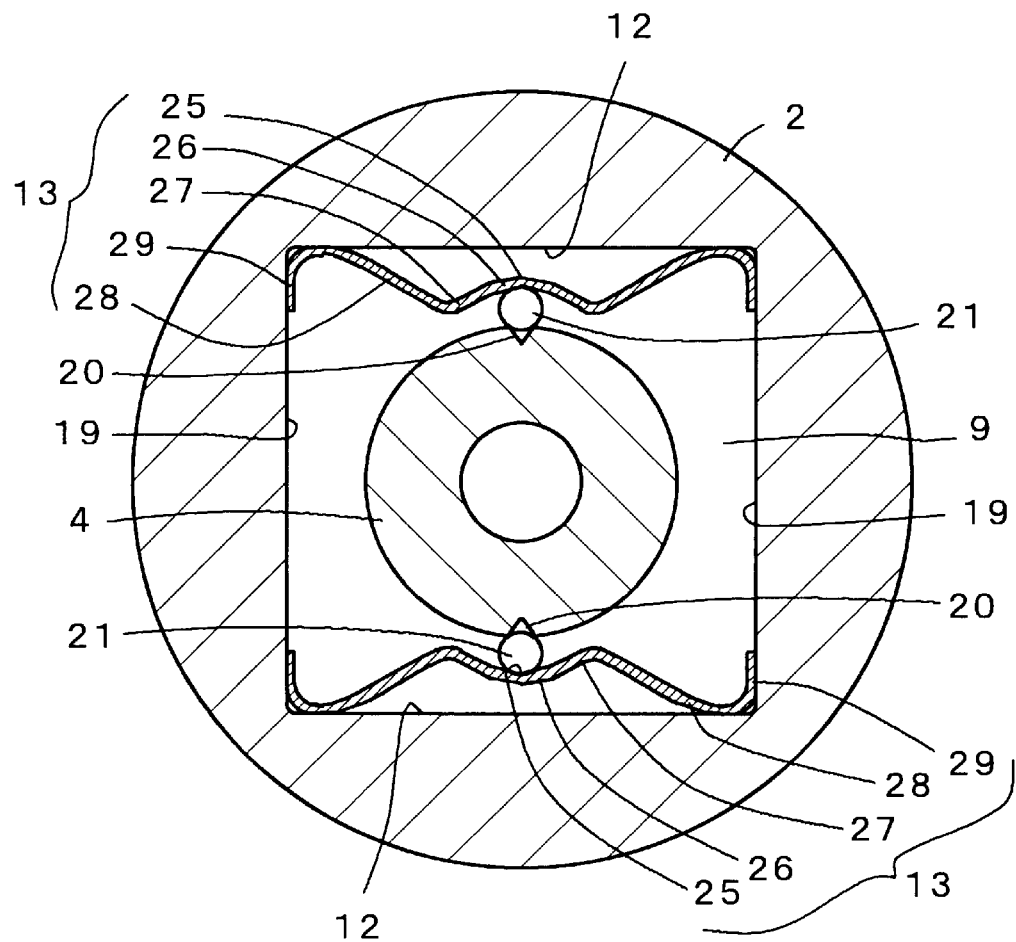
Figure 1:
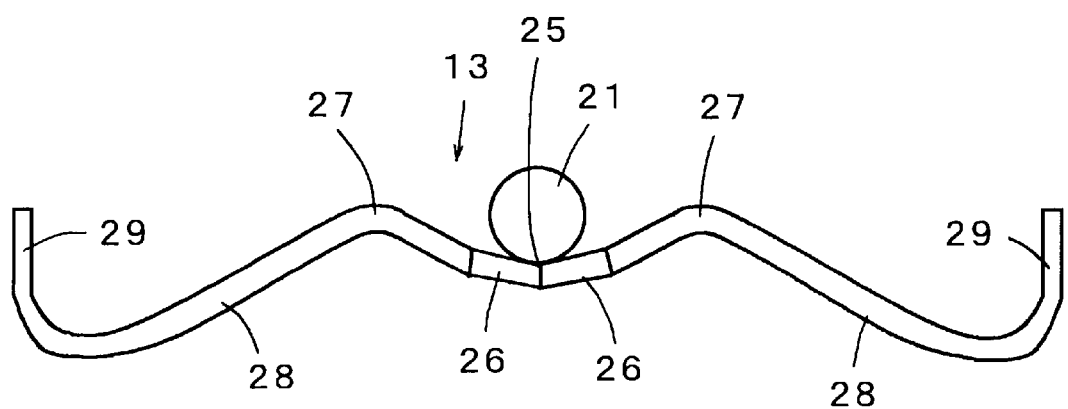

In a fourth embodiment shown in FIGS. 8, 9, the flat face 11 is not formed on the input shaft 4 and just an external circumference of the cylindrical input shaft 4 is utilized as the rolling surface. And a second supporting portion 20 of V-shaped groove or U-shaped groove is formed. However, the other composition is completely the same as the above first embodiment. Thus, the same reference numerals are attached to the same components and a description thereof in detail is omitted.

In the power steering apparatus according to the fourth embodiment, when the input shaft 4 and the output shaft 2 are rotated relative to each other, the balls or rollers 21 roll and move while deflecting the spring members 13 so that they slip out of between the first and second supporting portions 17, 20. Then, if the input shaft 4 and the output shaft 2 are further rotated relative to each other, the balls or rollers 21 roll and move between the flat portions 14 of the spring members 13 and the external circumference of the input shaft 4 while deflecting the spring members 13.

At this time, as shown in FIG. 9, the spring force $W_2$ at the contact point $P_2$ between the rolling surface and the ball or roller 21 is a force directing to the center O of the input shaft 4. Thus, an angle corresponding to $\theta_1$ in FIG. 5 is 0. That is, the spring force $W_2$ has no component acting in the rotation direction of the input shaft 4. Thus, unlike the first embodiment, the spring force component is not contained in the steering resistance while the ball or roller 21 is rolling on the external circumference of the input shaft.

Which should be selected the first embodiment or the fourth embodiment is determined depending on the characteristic of a vehicle. For example, if the steering resistance is desired to be changed depending on the spring force when the steering wheel is turned, a rolling surface which does not coincide with a circumference in which an axis of the input shaft 4 is a center thereof like the first embodiment only has to be formed. On the contrary, if the steering resistance produced when the steering wheel is turned is desired to be composed of only torsional resistance of the torsion bar 5, the external circumference of the cylindrical input shaft 4 like the fourth embodiment only has to be utilized.

An amount of deflection of the spring member 13 is changed by not only the shape of the rolling surface but also the shape of the spring member 13. It is possible to change a magnitude or direction of the spring force W so as to change the steering resistance, depending on the shapes of the rolling surface and the spring member.

In a fifth embodiment shown in FIGS. 10, 11, the leaf spring composing the spring member 13 has applied a different shape from the first embodiment. However, the other composition is completely the same as the first embodiment, and therefore the same reference numerals are attached to the same components and then a description thereof in detail is omitted.

As shown in FIGS. 10, 11, the leaf spring comprises a pair of slope portions 26 continuous while forming a valley portion 25, a pair of convex portions 27 continuous with ends of the slope portions 26, a pair of supporting leg portions 28 continuous with the convex portions 27 and a pair of hooking portions 29 continuous with ends of the supporting leg portions 28.

This leaf spring is hooked with its hooking portions 29 being made to contact firmly the corner portion of the spring storing chamber 9 like the first embodiment. When the input shaft 4 and the output shaft 2 are in their neutral condition in which they are not rotated relative to each other, the valley portion 25 formed by a pair of the slope portions 26 is made to oppose the second supporting portion 20 formed in the input shaft 4 and the ball or roller 21 is disposed therebetween. That is, according to the fifth embodiment, the valley portion 25 forms the first supporting portion for supporting the ball or roller 21.

When the input shaft 4 and the output shaft 2 are rotated relative to each other, the ball or roller 21 rolls while deflecting the spring member 13 and then slips out of the valley portion 25 and the second supporting portion 20. Then if the input shaft 4 and the output shaft 2 are further rotated relative to each other, the ball or roller 21 rolls between the slope portion 26 of the spring member 13 and the external circumference of the input shaft 4 while deflecting the spring member 13. The convex portion 27 functions as a stopper like the first embodiment.

In the power steering apparatus according to the fifth embodiment, the first supporting portion is not provided by forming a V-shaped groove or U-shaped groove but utilizing a valley portion 25 formed by a pair of slope portions 26. Thus as compared to a case in which the V-shaped groove or U-shaped groove is formed by bending a sheet material, formation of the leaf spring is facilitated. Although a large stress concentration is generated in the V-shaped groove or U-shaped groove, if the V-shaped groove or U-shaped groove is not formed, that stress concentration can be avoided so that the durability of the leaf spring can be improved. Particularly, if an angle of the valley portion 25 is set large, the stress concentration can be further avoided.

Further, if an angle created by the convex portion 27 is formed large as shown in FIGS. 10, 11, the stress concentration at that position can be avoided so that the durability of the spring member 13 can be improved.

Although in the first–fifth embodiments described above, the spring storing chamber 9 is formed directly at an end portion of the output shaft 2, it is permissible to form this spring storing chamber 9 in a member rotating integrally with the output shaft 2.

Figure 12:
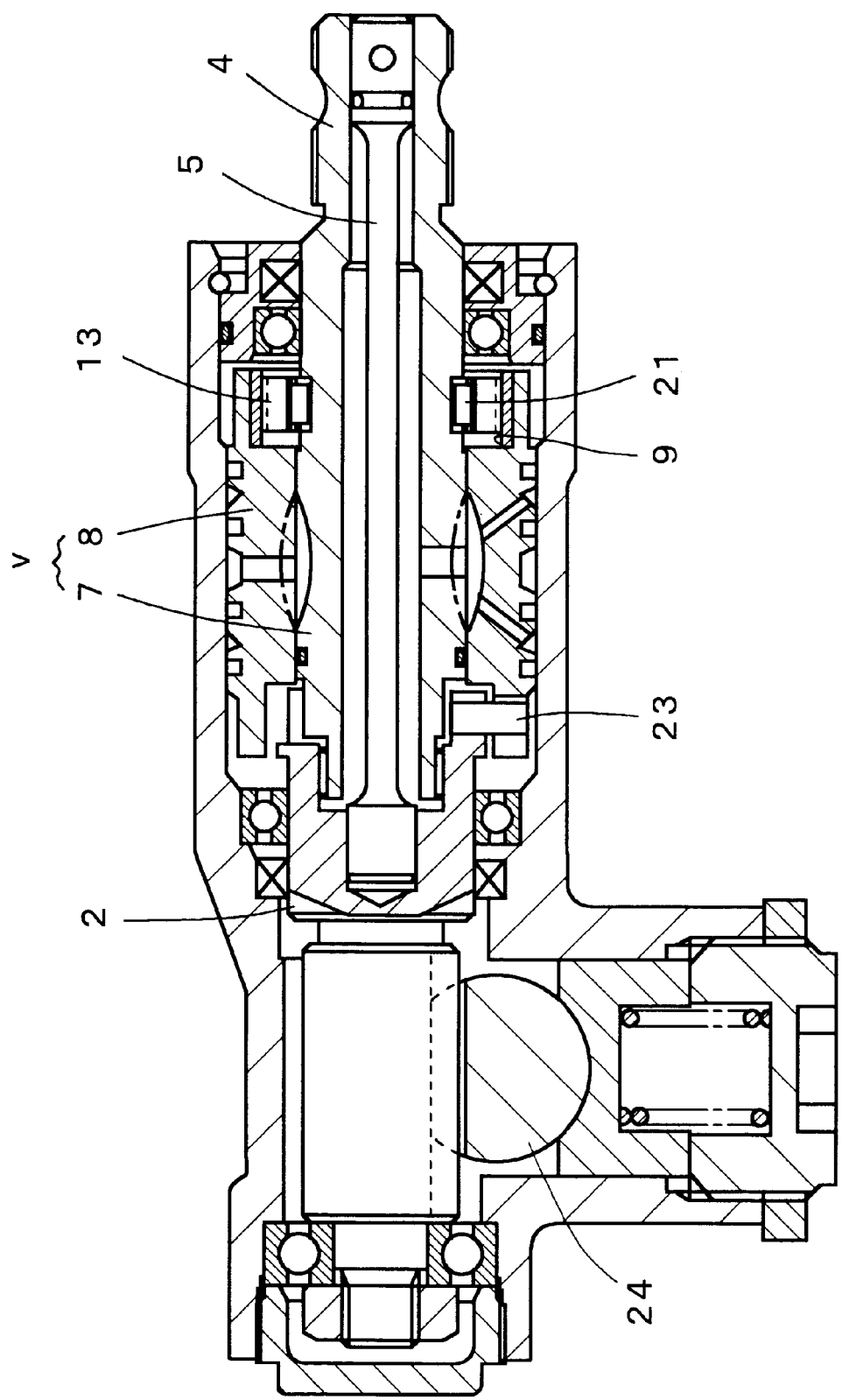
FIG. 12 is a sectional view of a power steering apparatus of rack and pinion type according to a sixth embodiment, indicating an example in which the spring storing chamber is provided in the rotary sleeve 8.

For example, the sixth embodiment shown in FIG. 12 is a power steering apparatus of rack and pinion type, in which a rotary sleeve 8 is connected to the output shaft 2 interconnected to a steering rod 24 through a pin 23. Then, the spring storing chamber 9 is formed in not the output shaft 2 but the rotary sleeve 8 rotating integrally therewith. However, a structure in which the input shaft 4 is located there so as to apply a preset force by means of the spring member 13 is the same.

In the case of the integral type described above also, it is also permissible to form the spring storing chamber 9 directly in the output shaft 2 or in a member rotating integrally with the output shaft 2.

Although in the above first–sixth embodiments, the spring storing chamber 9 is formed in the square shape, of course other shapes such as a circular shape are permitted. Further, the hooking portions 18 of the spring members 13 may be changed depending on a shape or the like of the spring storing chamber 9. For example, it is permissible to form slits in wall faces of the spring storing chamber 9 and insert ends of the spring member 13 so as to hook that spring member 13.

In the above first–sixth embodiments, when the spring member 13 is stored in the spring storing chamber 9, the spring member is secured at the corner portions of the spring storing chamber 9 in such a manner that the hooking portions thereof are in firm contact with the wall faces 12 and the wall faces 19 perpendicular thereto. As a result, an initial load is generated in this spring members 13 in proportion with a compression in the spring member 13. That initial load acts as a preset force in the direction of sandwiching the input shaft 4 through the ball or roller 21.

However, if a rotation force is input to the input/output shafts 2, 4, a transverse force Rx is applied through the ball or roller 21. If the transverse force Rx is applied so that the ball or roller 21 intends to slip out of the first and second supporting portions 17, 20, the spring member 13 is deflected in the transverse direction also.

This deflection of the spring member 13 becomes unequal between both ends of the ball or roller 21. The reason is that while one end thereof is compressed by the force Rx relative to the ball or roller 21, the other end thereof is stretched by the force Rx. At this time, a hooking force of the hooking portion 18 of that other end is decreased in proportion with the amount of the stretching. That is, the pressing force toward the wall face 19 is decreased. Because the spring members 13 are fixed to the wall faces 19 by a pressing force produced by the elasticity of the hooking portion 18, if this pressing force changes, the spring member 13 can be deflected in the transverse direction or slid.

If the spring member 13 is deflected in the transverse direction, a force of pressing the input shaft 4 is also deflected, so that the preset force may become instable.

Figure 13:
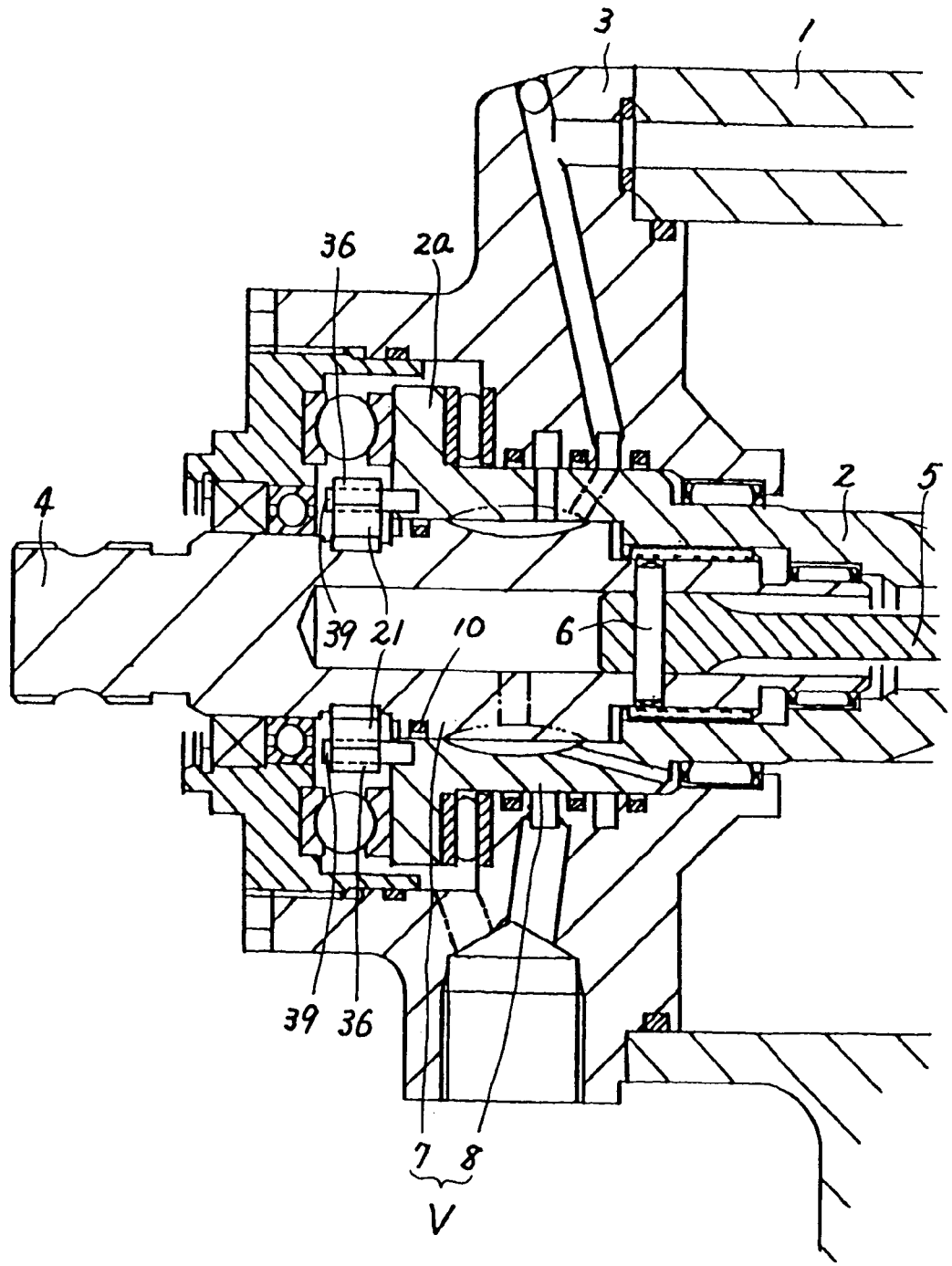
FIG. 13 is a sectional view of the power steering apparatus according to a seventh embodiment.
Figure 1:
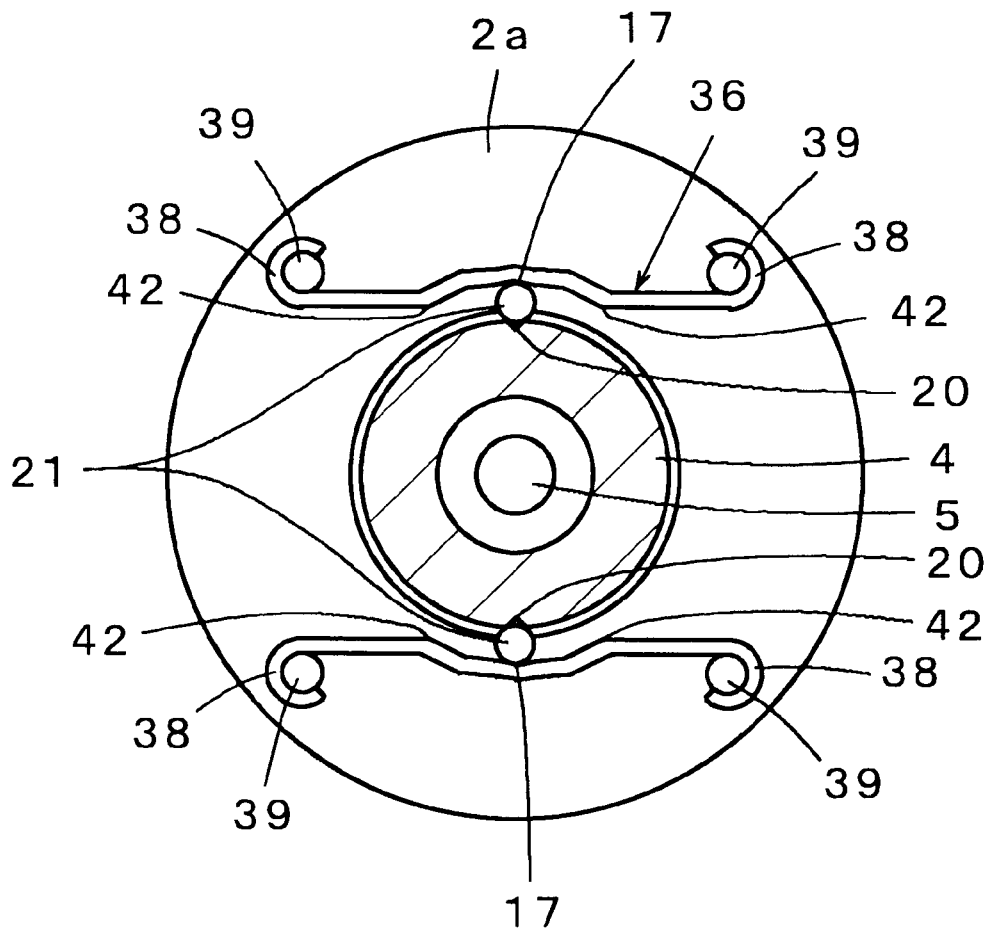
Figure 1:
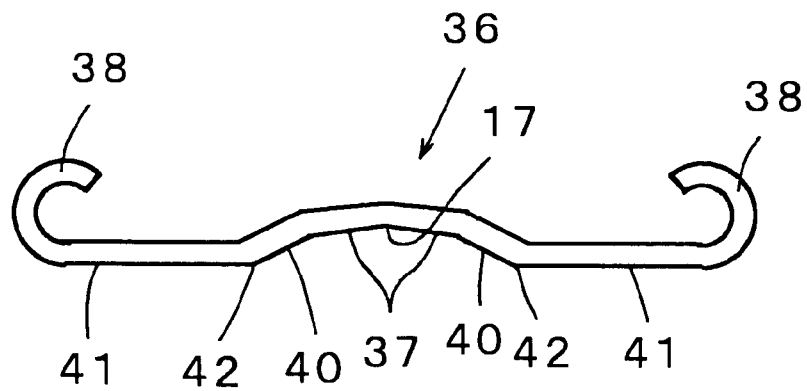

In the seventh embodiment shown in FIGS. 13–15, the leaf springs 37 which are sheet-shaped elastic members are attached to the large-diameter portion 2a in which the rotary sleeve 8 is formed integrally and different from the first–sixth embodiments, the leaf springs 36 are directly fixed to the large-diameter portion 2a without forming the spring storing chamber 9.

However, the structure in which the steering valve v is switched so as to apply the assist force by making the input shaft 4 and the output shaft 2 rotate relative to each other is the same as the first–sixth embodiments. Then, the same reference numerals are attached to the same components for description thereof.

As shown in FIG. 15, a valley portion surrounded by mild slope faces 37 is formed in the center of the leaf spring 36 and acts as a first supporting portion 17. The first supporting portion 17 has fixing portions 38 formed by bending the leaf spring 36 at both ends thereof.

As shown in FIG. 14, the large-diameter portion 2a has fixing pins 39 which act as fixing means, and the aforementioned fixing portions 38 are hooked on these fixing pins 39 so as to fix the leaf spring 36.

Milder slope faces 40 extend outside of the aforementioned slope faces 37 and a boundary between the slope face 40 and the flat face 41 acts as a stopper portion 42. The stopper portions 42 prevent the ball or roller 21 from slipping out of a gap between the leaf spring 36 and the input shaft 4, corresponding to the convex portion 15 in the first–sixth embodiments.

That is, even if the ball or roller 21 goes out of the first supporting portion 17 when the input/output shafts are rotated relative to each other, it is only moved up to a place in which it contacts this stopper portion 42.

Further, with the second supporting portion 20 of the V-shaped groove formed on an external circumference of the input shaft 4 facing the aforementioned first supporting portion 17, the ball or roller 21 is disposed therebetween. The state shown in FIG. 14 in which the ball or roller 21 is supported between the first supporting portion 17 and the second supporting portion 20 is the neutral condition.

An operation of the leaf spring 36's applying a preset force by its spring force in the aforementioned preset force applying mechanism is the same as that of the conventional spring member 13, and a description thereof is omitted.

When the input shaft 4 and the output shaft 2 are rotated relative to each other so that the ball or roller 21 is about to slip out of the gap between the first supporting portion 17 and the second supporting portion 20, a transverse force such as the aforementioned transverse force Rx is applied to the leaf spring 36.

However, because the fixing portions 38 on both the ends of the leaf spring 36 are fixed by the fixing pins 39, the leaf spring 36 is not loose in the transverse direction.

The first supporting portion 17 formed on the leaf spring 36 according to the seventh embodiment is formed by the slope faces 37 mildly inclined. Therefore it is easier to process than a case in which a deep V-shaped groove or U-shaped groove is formed. Further, although concentration of stress is generated in the V-shaped groove or U-shaped groove formed by bending the spring member largely, if such a V-shaped groove or U-shaped groove is not formed, the concentration of stress can be avoided so that the durability of the leaf spring 36 can be increased.

Additionally, in the seventh embodiment, the fixing portions 38 of the leaf spring 36 are formed by only bending both ends thereof. Therefore they can be formed easily. Then the fixing portions 38 only have to be hooked on the fixing pins 39 provided on the large-diameter portion 2a. Thus the fixing operation for the leaf springs 36 is very easy.

Figure 16:
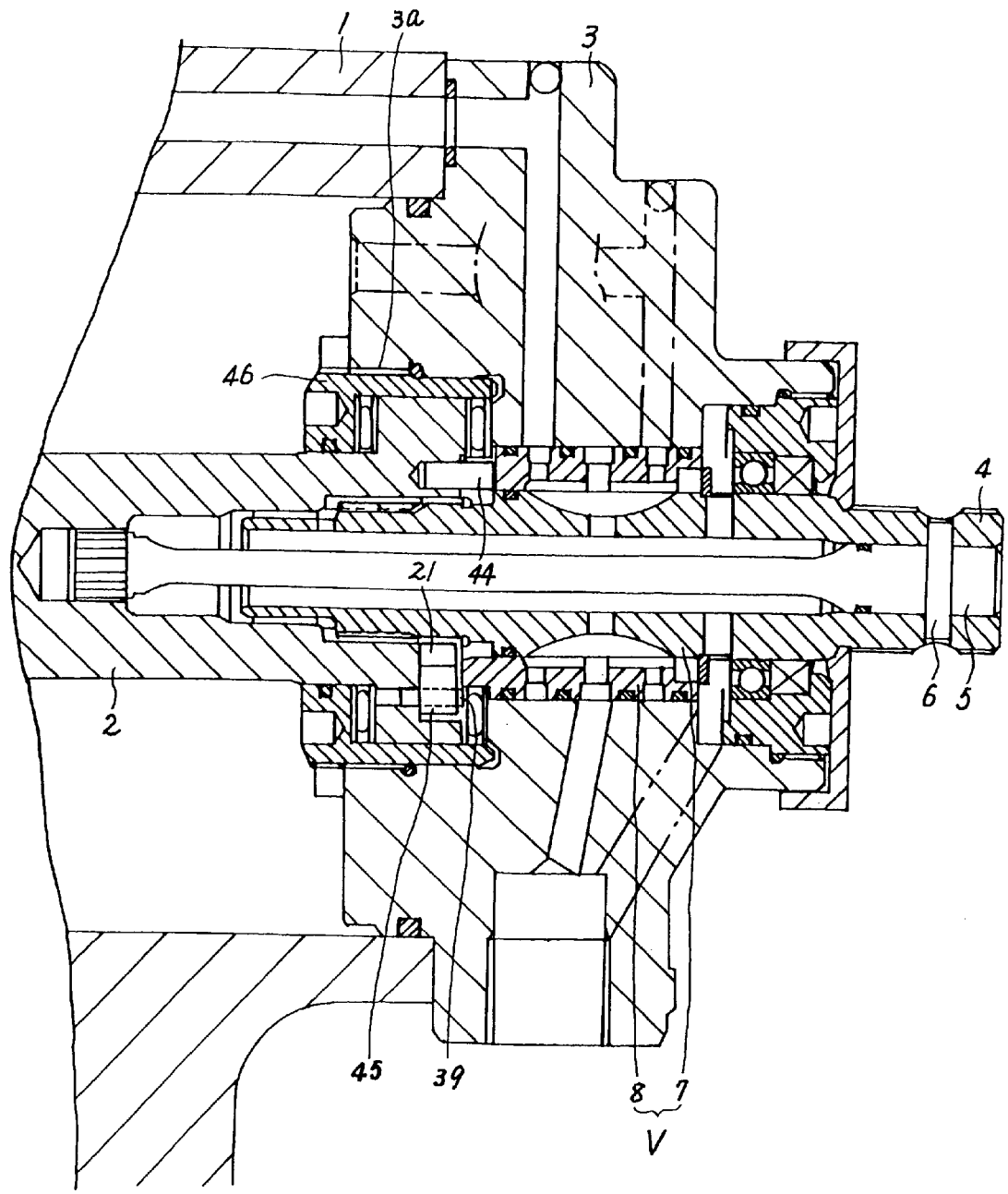
FIG. 16 is a sectional view of the power steering apparatus according to an eighth embodiment, indicated by the lines XVI—XVI in FIG. 17.
Figure 1:
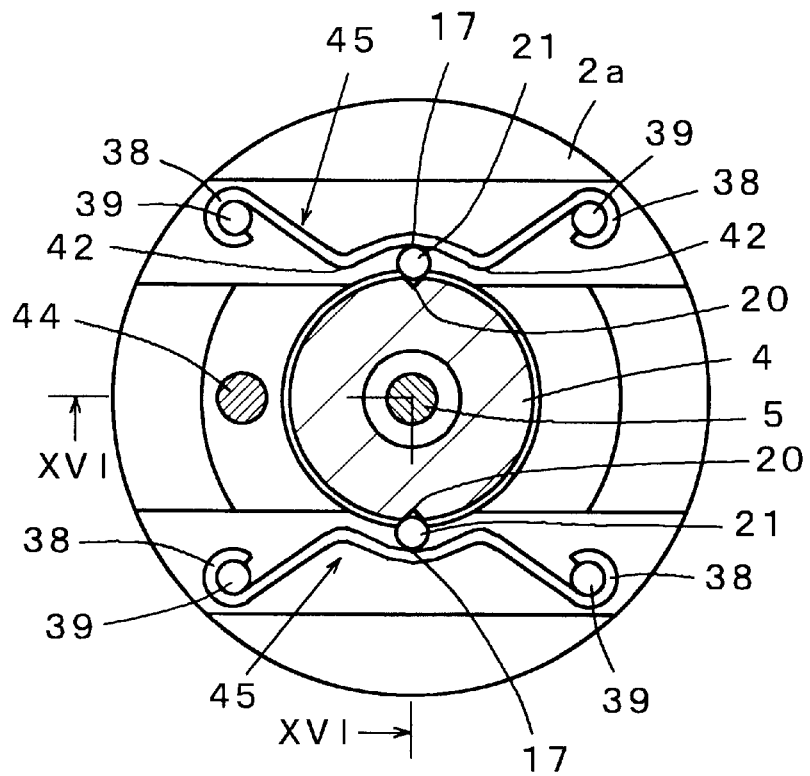
Figure 1:
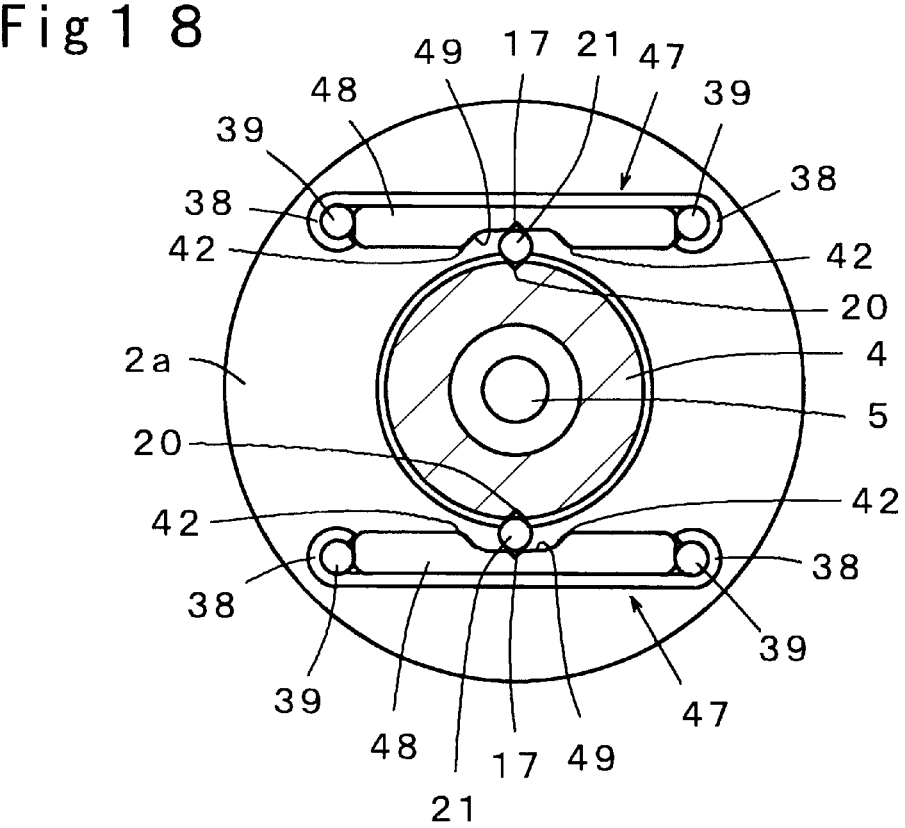

According to an eighth embodiment shown in FIGS. 16, 17, the output shaft 2 and the rotary sleeve 8 are separate members and the large-diameter portion 2a of the output shaft 2 is interconnected with the rotary sleeve 8 by means of an interconnecting pin 44, which point is different from the aforementioned seventh embodiment. To provide a preset force applying mechanism between the output shaft 2 and the rotary sleeve 8, the leaf spring 45 which is a sheet-shaped elastic member is fixed on the large-diameter portion 2a of the output shaft 2.

The above large-diameter portion 2a is inserted into a stepped portion 3a of the valve case 3 and fixed by a cylindrical member 46. This cylindrical member 46 is squeezed into the stepped portion 3a of the valve case 3 from the power cylinder 1 side and fixed there.

The same reference numerals are attached to members exerting the same operation as the seventh embodiment for a description thereof.

FIG. 16 is a sectional view taken along the lines XVI—XVI in FIG. 17.

A sheet-shaped elastic member according to the eighth embodiment is a leaf spring 45 formed by bending an elastic sheet as shown in FIG. 17. A small first supporting portion 17 of V-shaped groove is formed in the center thereof and mountain-shaped stopper portions 42 continuous from mild slopes extending on both sides of the first supporting portion 17 are formed. This stopper portion 42 exerts the same function as in the seventh embodiment.

Curled fixing portions 38 are formed on both ends thereof. The fixing portions 38 are hooked on fixing pins 39 fixed onto the large-diameter portion 2a of the output shaft 2.

The ball or roller 21 is disposed between the first and second supporting portions 17, 20 thereby forming a preset applying mechanism.

Because the leaf spring 45 of the second embodiment is fixed at its both ends by the fixing pins 39, the deflection in transverse direction can be prevented. Thus, the preset force does not become unstable.

A ninth embodiment shown in FIG. 18 is different from the seventh and eighth embodiments in that the sheet-shaped elastic member comprises a leaf spring 47 and a cam 48.

The sheet-shaped elastic member comprising the leaf spring 47 and the cam 48 is fixed on the large-diameter portion 2a of the output shaft 2 in the power steering apparatus like in FIG. 13.

Although both ends of the leaf spring 47 are curled to form fixing portions 38, the other portion is flat.

The cam 48 is made of material having a higher stiffness than the leaf spring 47.

A mild concave portion 49 is formed in the center of the cam 48 and a first supporting portion 17 of V-shaped groove is formed in the center thereof. Both ends of the concave portion 49 act as a stopper portion 42.

Then, the fixing portions 38 of the leaf spring 47 are hooked on the fixing pins 39 so as to fix the leaf spring 47 onto the large-diameter portion 2a and the cam 48 is disposed between the fixing portions 38.

The ball or roller 21 is disposed between the first supporting portion 17 formed in the above cam 48 and the second supporting portion 20 such that a preset force using a spring force of the leaf spring 47 is applied to the input shaft 4.

When the input/output shafts 4, 2 are about to slip out of the first and second supporting portions 17, 20 due to relative rotation therebetween, a transverse force is applied to the sheet-shaped elastic member. However, because both ends of the leaf spring 47 are fixed, it is never deflected.

Particularly because a cam 48 having a high stiffness is provided between the fixing portions 38, stiffness in the transverse direction is tremendously increased. Thus, the transverse deflection is further decreased so that the stability is increased.

Because the first supporting portion 17 for supporting the ball or roller 21 is formed in the cam 48, the configuration of the leaf spring 47 is simplified so that processing of the leaf spring 47 is facilitated.

Figure 19:
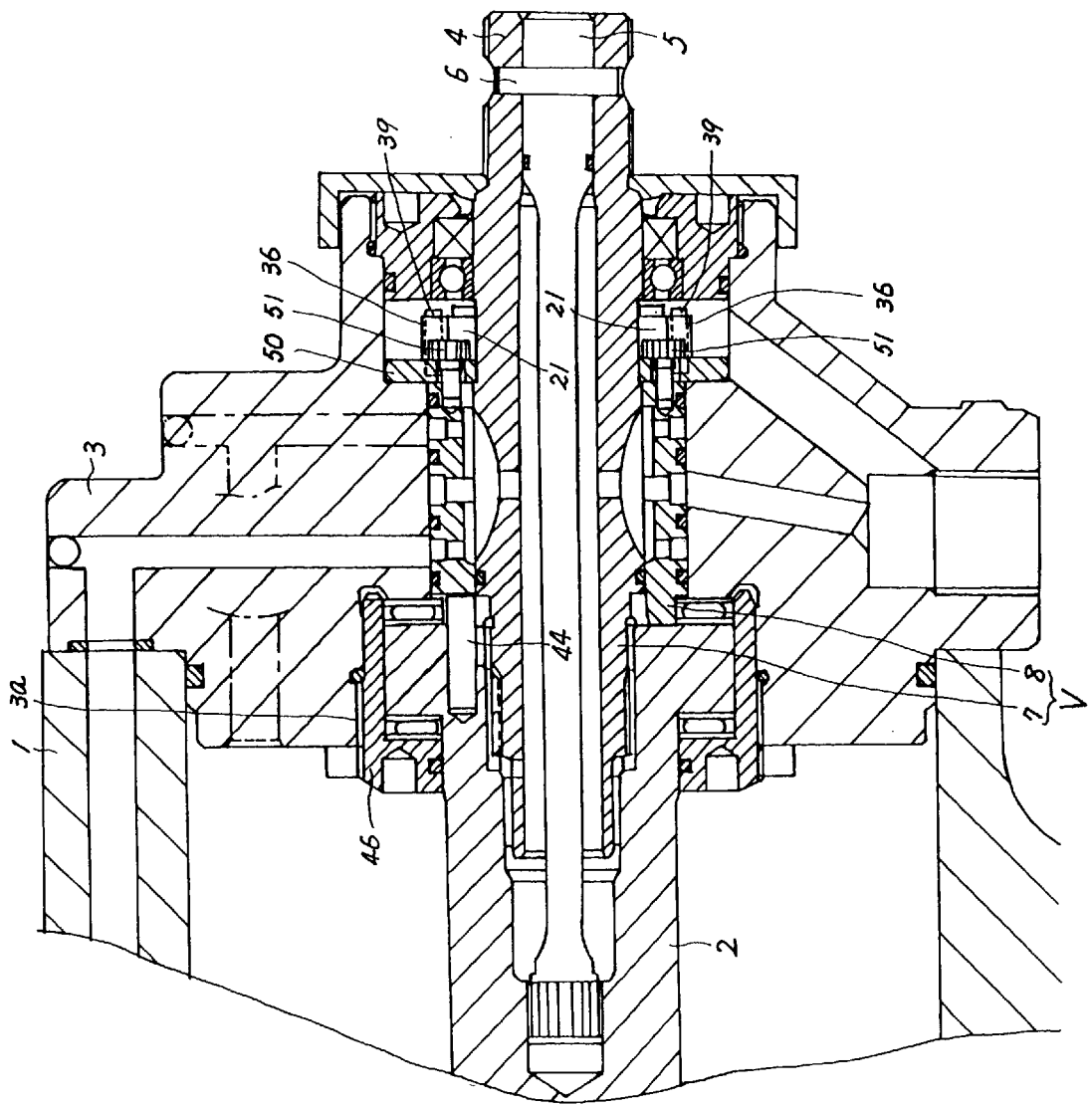
FIG. 19 is a sectional view of the power steering apparatus according to a tenth embodiment, indicating an example in which a fixing ring is installed on the rotary sleeve.
Figure 2:
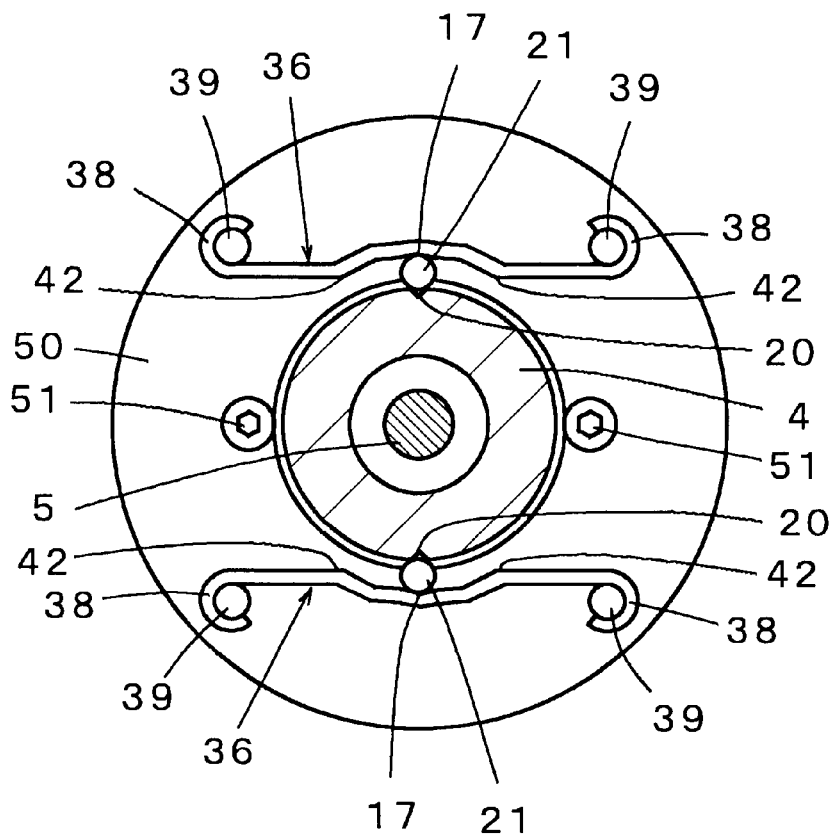
Figure 2:
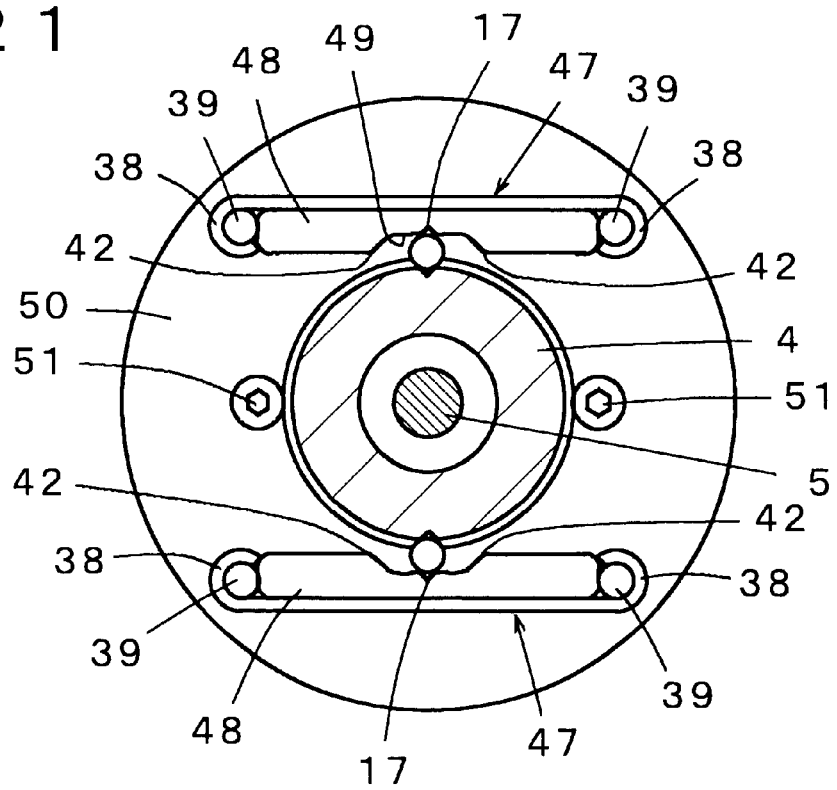

In the tenth embodiment shown in FIGS. 19, 20, the preset force applying mechanism is mounted to an end portion opposite to the output shaft 2, of the rotary sleeve 8 of the same power steering apparatus as shown in FIG. 16. Then, the sheet-shaped elastic member is mounted through a fixing ring 50 which is a member different from the rotary sleeve 8. Here the rotary sleeve 8 and the fixing ring 50 are members rotating integrally with the output shaft 2.

Like the seventh embodiment, the fixing portions 38 of the leaf spring 36 which is a sheet-shaped elastic member are hooked on the fixing pins 39 fixed on the fixing ring 50 and the fixing ring 50 is fixed to the rotary sleeve 8 by two bolts 51.

Because a mechanism for applying the preset force and reducing a transverse deflection of the spring member 36 is the same as the first embodiment, a description thereof is omitted.

According to an eleventh embodiment shown in FIG. 21, the sheet-shaped elastic member comprising the same leaf spring 47 and cam 48 as the ninth embodiment is fixed to the fixing ring 50 and the other structure is the same as the tenth embodiment.

In the tenth and eleventh embodiments, the leaf springs 36, 47 are not fixed directly to the rotary sleeve 8 but fixed through the fixing ring 50. According to this structure, the fixing ring 50 can be fixed by bolts or the like after centering work for the steering valve is ended.

If when the fixing ring 50 is fixed onto the rotary sleeve 8, a position thereof is adjusted to set it at a centering position of the preset force applying mechanism and then a bolt 51 is tightened, centering of the preset force applying mechanism can be carried out without destroying the centering of the steering valve. This is also the same in a case in which the fixing ring 50 is fixed to an end portion of the output shaft 2.

Thus, there is such an advantage that the centering of the valve and the centering of the preset force applying mechanism can be established at the same time.

As a method for fine adjustment of relative positions of the fixing ring 50 and the rotary sleeve 8, following methods are available.

Through holes through which the bolts 51 go are formed in the fixing ring 50 and a play is provided between this through hole and the bolt 51. Then, when the bolt 51 is inserted into this through hole, the position of the fixing ring 50 can be adjusted by an amount of that play.

Even if the leaf springs 36, 45 are fixed directly to the rotary sleeve 8 without use of any fixing ring 50, it is possible to prevent the transverse deflection like other embodiments.

Although in the above seventh–ninth embodiments, the sheet-shaped elastic members are directly fixed to the output shaft 2 or the rotary sleeve rotating integrally with the output shaft, it can be fixed through the fixing ring 50.

Although in the above embodiments, the fixing portions are formed by curling both ends of the leaf spring composing the sheet-shaped elastic member such that they are hooked on the fixing pins, the shape of the fixing portion and the fixing means are not restricted to this example.

Although the embodiment utilizing the hydraulic type power steering apparatus has been described above, the same preset force applying mechanism can be mounted on an electric type power steering apparatus as well.

Figure 22:
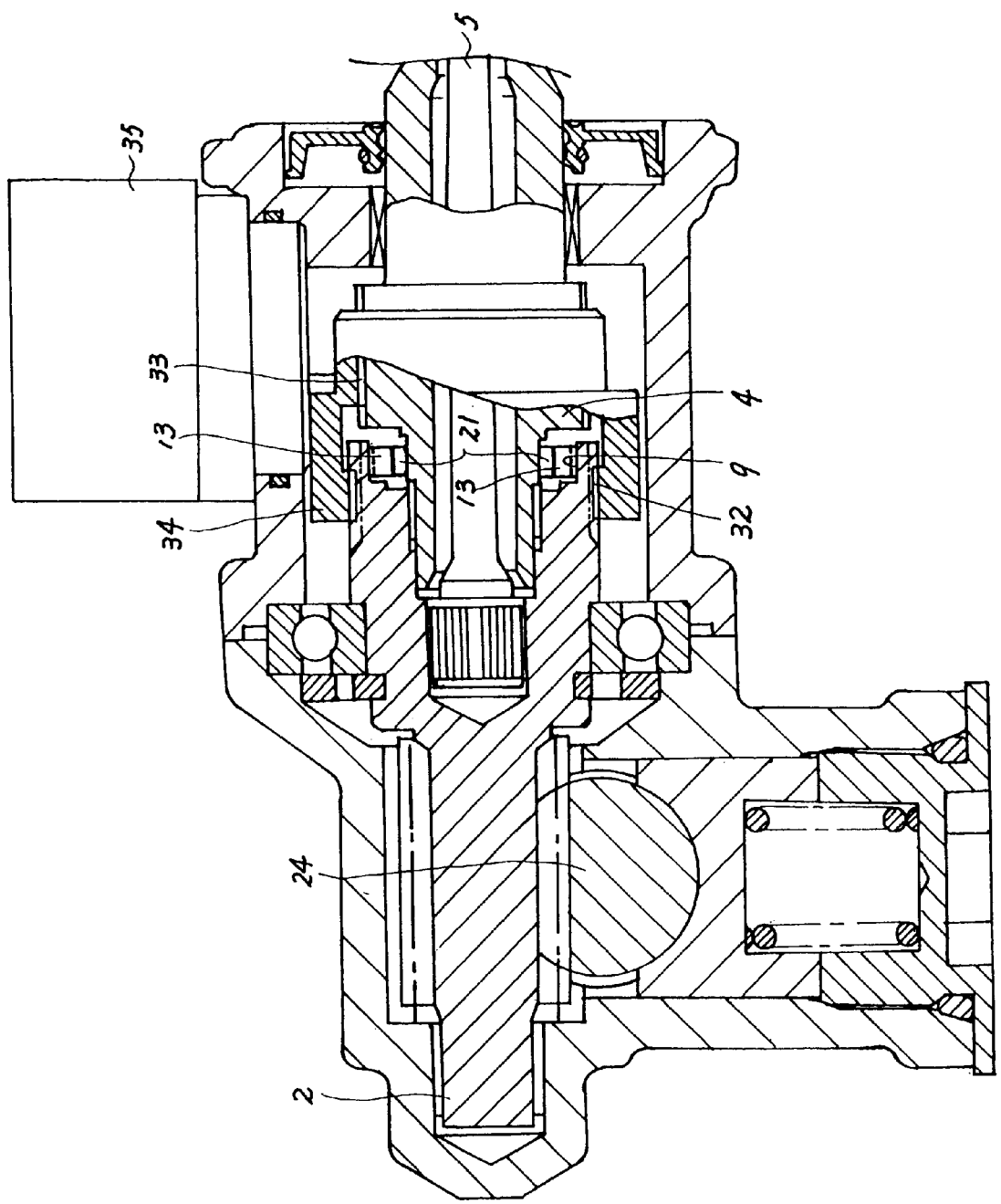
FIG. 22 is a sectional view of the power steering apparatus according to a twelfth embodiment.

A twelfth embodiment shown in FIG. 22 is an electric type power steering apparatus for producing an assist force by means of an electric motor (not shown) depending on an amount of rotations of the output shaft 2 and the output shaft 4.

Then the amount of the relative rotation is detected as a magnitude of input torque or a direction thereof and signals are transmitted to an electric motor.

In the twelfth embodiment, if the input shaft 4 and the output shaft 2 are rotated relative to each other, the output shaft 2 and a slider provided on an external circumference of the input shaft 4 are moved in axial direction and a torque sensor 35 detects input torque according to an amount of this travelling. The above slider 34 is connected to the output shaft 2 through a screw portion 32 and to the input shaft 4 through a spline 33. Thus the slider 34 is restrained from moving in the rotation direction and allowed to move only in axial direction.

Thus if the input shaft 4 is rotated relative to the output shaft 2, the slider 34 is moved in the axial direction.

Figure 23:
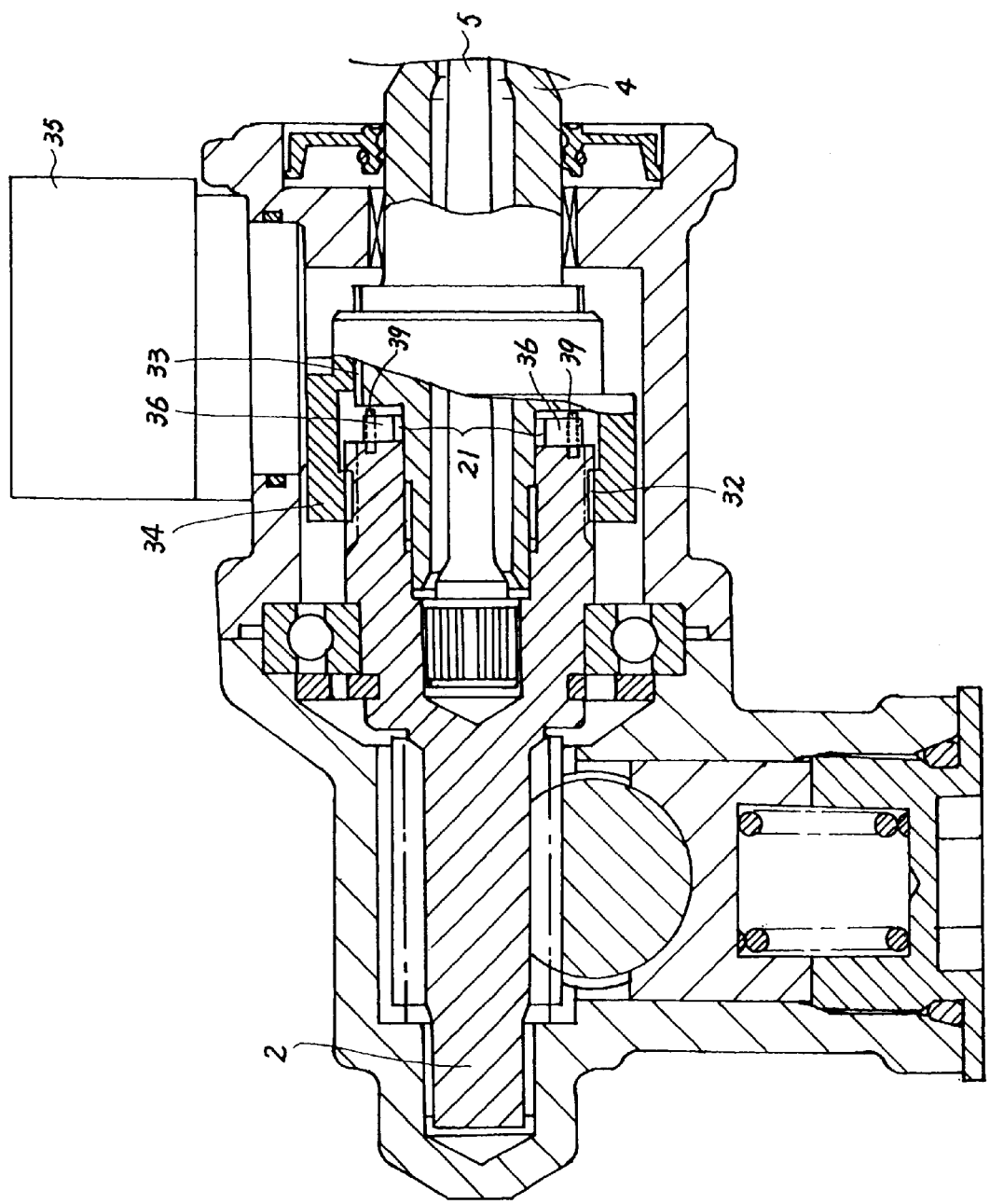
FIG. 23 is a sectional view of the power steering apparatus according to the twelfth embodiment.

Such a structure in which the spring members 13 are disposed so as to sandwich the input shaft 4 in the spring storing chamber 9 formed at the end portion of the output shaft 2 in order to apply the preset force is the same as in the first embodiment. All the preset force applying mechanisms of the first–sixth embodiment as well as the first embodiment can be provided on an electric type power steering apparatus. As shown in FIG. 23, all the preset force applying mechanisms of the seventh–eleventh embodiments using the fixing pin 39 can be provided on the electric type power steering apparatus.

The method for detecting input torque is not restricted to the above method. For example, there is a method in which the torsion bar 5 is provided with a distortion gauge and its detected value is converted to input torque.

Figure 24:
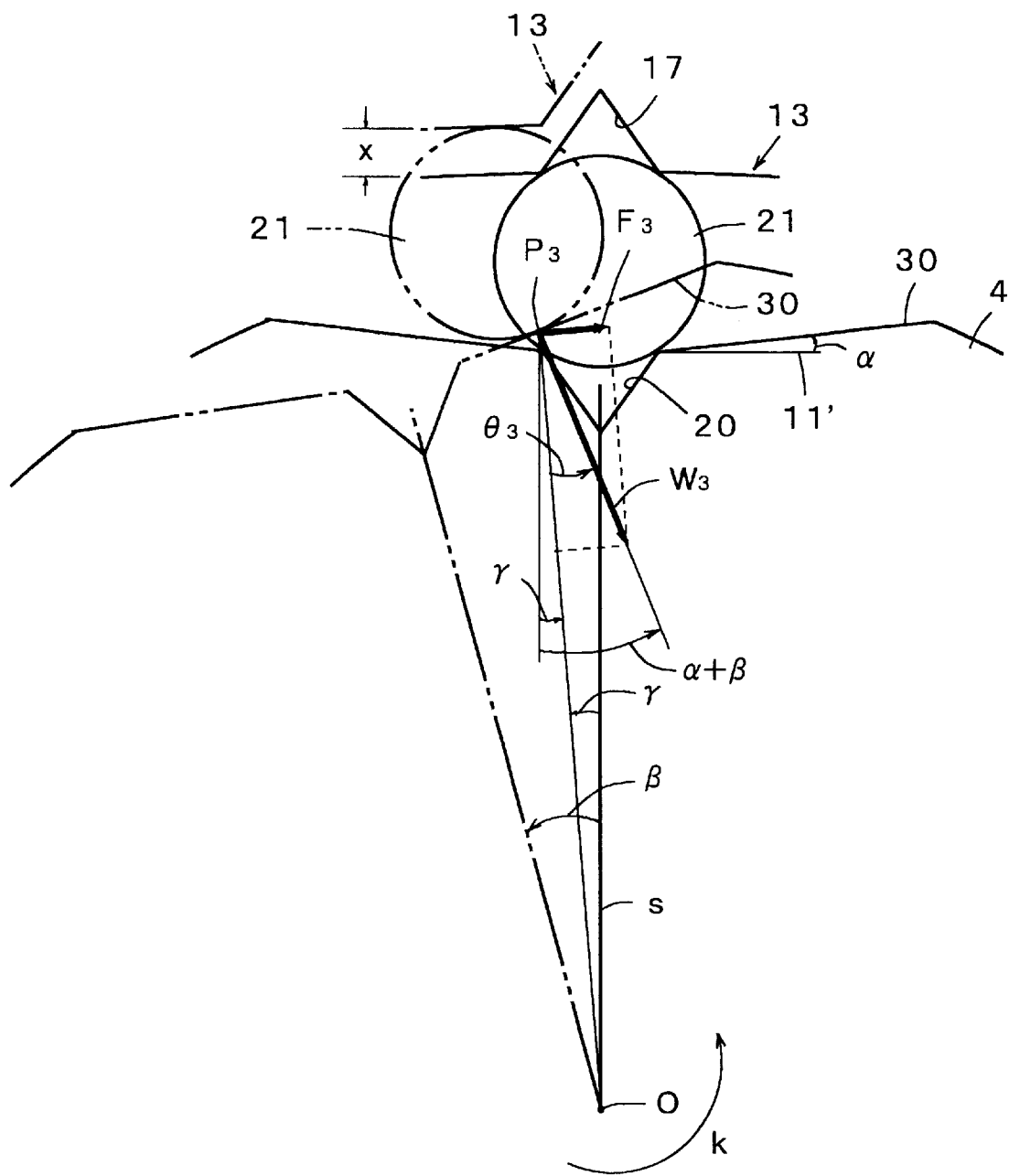
FIG. 24 is a model diagram showing a condition in the vicinity of a rolling surface according to a thirteenth embodiment.

The thirteenth embodiment shown in FIG. 24 is an example in which the configuration of the rolling surface 30 is changed to change the steering resistance.??

FIG. 24 is a model diagram of a rolling surface 30 on which the ball or roller 21 rolls.

This rolling surface 30 are flat planes formed symmetrically relative to a second supporting portion 20 which extend on both sides of the second supporting portion 20. Then this plane is formed with a flat plane having an angle $\alpha$ relative to a line 11' connecting both end portions of the second supporting portion 20.

The construction except the rolling surface 30 is completely the same as the first embodiment. Thus the same reference numerals are attached to the same components. This rolling surface may be applied to the other embodiments.

In FIG. 24, the neutral position is indicated by solid line while a state produced when the input shaft 4 is rotated at an angle $\beta$ in a direction of the arrow k is indicated by two dots and dash line. Additionally, a line passing through the center of the second supporting portion 20 and the center 0 of the input shaft 4 under the neutral condition is assumed to be reference line s.

When the input shaft 4 is rotated at an angle $\beta$ in the direction of the arrow k, a spring force $W_3$ at a contact point $P_3$ produces a component force $F_3 = W \cdot \sin\theta_3$ having an angle $\theta_3$ relative to the line $OP_3$. This component force $F_3$ acts so as to increase the steering resistance in the same direction as the steering resistance.

The x in FIG. 24 is an amount of deflection in the spring member 13 which occurs when the ball or roller 21 rolls and moves. This amount x of the deflection a is a value which changes depending on a position of the ball or roller 21. The spring force $W_3$ is determined depending on this amount x of the deflection.

The amount x of the deflection of the spring member 13 depending on the position of the ball or roller 21 is changed by not only the configuration of the rolling surface but also that of the spring member 13.

That is, a magnitude of the spring force $W_3$ is determined depending on configurations of the rolling surface 30 and spring member 13. A direction of the spring force $W_3$ is determined by the configuration of the rolling surface 30 and a direction of the component force is also determined. Thus, the configuration of the rolling surface 30 and the configuration of the spring member 13 only have to be specified so as to produce the steering resistance.

For example, if the rolling surface 30 does not coincide with a circular face formed around an axis O of the input shaft, $\theta_3 \neq 0$ in any configuration and the component force of the spring force is $F_3 \neq 0$. Then, this rolling surface may be composed of not a flat face but a curved face.

In the thirteenth embodiment, $\sin \theta_3 > 0$ is always established. Thus the component force $F_3$ is opposite to the direction of the arrow k of the input shaft 4 so that it acts to increase the steering resistance. However, depending on an angle $\alpha$, the direction of the component force $F_3$ of the spring force can be the same as the rotation direction of the arrow k of the input shaft 4 so as to decrease the steering resistance. Because, assuming an angle between a line $OP_3$ and a reference line s is $\chi$ in FIG. 24, $\theta_3 = \alpha + \beta - \chi$ is established, $\sin \theta_3 < 0$ is established depending on choice of the angle $\alpha$. Thus it is found that the direction of the component force $F_3$ of the spring force is changed. Where for each angle, the direction of the arrow in FIG. 24 is positive.

As described above, depending on the configurations of the rolling surface 30 and the spring member 13, it is possible to change a magnitude and a direction of the spring force $W_3$ so as to change the component force $F_3$ thereby changing the steering resistance.

According to the first invention, the neutral rigidity can be raised by applying the preset force so that the stability of straight traveling of a vehicle can be ensured.

Because the spring members are disposed on both sides of the input shaft so as to apply the preset force, a balance of the preset force can be obtained. Thus the neutral rigidity does not differ depending on the direction in which the steering wheel is steered.

Further because the spring members do not have to be fit to protrusions of the input shaft unlike conventional examples but the spring members may be incorporated in the spring storing chamber separately from the input shaft, the assembly performance can be raised.

The preset force can be adjusted easily by not only the spring force of the spring member but also a diameter of the ball or roller.

Further, because when the input shaft and the output shaft are rotated relative to each other, the ball or roller rolls and moves while twisting the spring members so that it slips out of the first and second supporting portions, it is possible to decrease friction which may occur.

According to the second invention, when the input shaft and the output shaft are rotated relative to each other in the first invention, the ball or roller rolls and moves between the spring member and the external circumference of the input shaft, so that the friction which may occur can be decreased. Thus, the characteristic between the input torque of the steering wheel and relative rotations of the input/output shafts can be made smooth.

According to the third invention, when the ball or roller slipping out of the first and second supporting portions roll and moves along the rolling surface formed on the input shaft in the second invention, a component force of the spring force, which is synthesized with the steering resistance is generated. Thus the steering resistance can be changed. Thus, by determining the configuration of the rolling surface, it is possible to change the steering resistance depending on a degree of steering of the steering wheel.

According to the fourth invention, the rolling surface is made of a flat surface in the third invention. Thus, this rolling surface is easier to form than a case in which that surface is formed of a circular face.

According to the fifth invention, even if the relative rotation between the input shaft and the output shaft is increased in the second–fourth invention so that the ball or roller is moved excessively, it goes into contact with the stopper. Thus, it is possible to prevent the ball or roller from slipping out.

According to the sixth or seventh invention, a cheap leaf spring is utilized as the spring member in the first–fifth invention. Thus production cost can be reduced.

Particularly according to the seventh invention, because the valley portion formed by a pair of the slope portions is utilized as the first supporting portion, formation of the leaf spring is facilitated. Further, although a large concentration of stress is generated in the V-shaped groove or U-shaped groove formed by bending the leaf spring largely, if such V-shaped groove or U-shaped groove is not formed, it is possible to avoid the concentration of stress thereby enhancing the durability of the leaf spring.

According to the eighth invention, because the spring members can be hooked by utilizing the spring force in the sixth or seventh invention, the position thereof can be secured. Further, it is not necessary to process the spring storing chamber or install other members thereby enhancing the assembly performance.

According to the ninth invention, by fixing both ends of the sheet-shaped elastic member not so as to move in the first–fifth invention, it is possible to prevent the sheet-shaped elastic member from being loose and stabilize load pressing the roller thereby applying an appropriate preset force.

According to the tenth invention, because the first supporting portion for supporting the roller does not have to be formed in the spring member in the ninth invention, processing of the spring member is facilitated.

Further, by providing with the cam, stiffness in a direction perpendicular to the preset force is increased so that looseness of the sheet-shaped elastic member can be prevented further securely.

What is claimed is:

1. A power steering apparatus comprising an input shaft adapted to be connected to a steering wheel, an output shaft adapted to be connected to wheels, a torsion bar connecting said input shaft and said output shaft, said input shaft and said output shaft being rotatable relative to each other while twisting said torsion bar so as to apply an assist force corresponding to an amount of the relative rotation, a pair of spring members disposed in said output shaft or a member rotating integrally with said output shaft so as to sandwich said input shaft, first supporting portions formed in said spring members, second supporting portions formed on an external circumference of said input shaft so as to oppose said first supporting portions when said input shaft and said output shaft are in neutral position, and balls or rollers disposed between said first and second supporting portions which oppose each other, wherein when said input shaft and said output shaft are rotated relative to each other so that said balls or rollers are about to slip out of said first and second supporting portions, said balls or rollers roll and move between said first and second supporting portions while deflecting said spring members, said balls or rollers slipping out of said first and second supporting portions and rolling and moving between said spring members and the external circumference of said input shaft while deflecting said spring members, a rolling surface continuous from said second supporting portion being formed on both sides of said second supporting portion formed on an external circumference of said input shaft while said rolling surface is a plane which does not coincide with a circular face formed around an axis of said input shaft, and when said input shaft and said output shaft are rotated relative to each other, said ball or roller slipping out of said first and second supporting portions rolling and moving on said rolling surface while twisting said spring member, a force of said spring member at a contact point between said ball or roller and said rolling surface generating a component force in the same direction as or opposite direction to a rotation direction of said input shaft.

2. A power steering apparatus according to claim 1 wherein the rolling surfaces are flat faces.

3. A power steering apparatus according to claim 1 wherein a pair of stoppers are formed on each of the spring members such that when said input shaft and said output shaft are rotated by a predetermined amount relative to each other, the balls or rollers make a contact with said stoppers.

4. A power steering apparatus according to claim 1 wherein the spring member is formed of a leaf spring comprising a first supporting portion of V-shaped groove or U-shaped groove, a pair of flat portions or slope portions continuous with said first supporting portion, a pair of convex portions continuous with ends of the flat portions or slope portions, a pair of supporting leg portions continuous with the convex portions, and a pair of hooking portions continuous with ends of the supporting leg portions, wherein the balls or rollers slipping out of said first and second supporting portions roll and move between the flat portions or the slope portions and the external circumference of said input shaft while deflecting said leaf spring.

5. A power steering apparatus according to claim 1 wherein the spring member is formed of a leaf spring comprising a pair of slope portions continuous while forming a valley portion, a pair of convex portions continuous with ends of said slope portions, a pair of supporting leg portions continuous with said convex portions, and a pair of hooking portions continuous with ends of said supporting leg portions, wherein said valley portion acts as a first supporting portion and the balls or rollers slipping out of said first and second supporting portions roll and move between the slope portions and the external circumference of said input shaft while deflecting said leaf spring.

6. A power steering apparatus according to claim 4 wherein a spring storing chamber is provided in the output shaft or a member rotating integrally with said output shaft and the leaf springs are stored in said spring storing chamber and secured therein by making the hooking portions thereof in firm contact with wall faces.

7. A power steering apparatus according to claim 1 comprising sheet-shaped elastic members as spring members, wherein fixing portions are provided on both ends of said sheet-shaped elastic members and said fixing portions are fixed to said output shaft or a member rotating integrally with said output shaft by fixing means the position of which is not changed.

8. A power steering apparatus according to claim 7 wherein the sheet-shaped elastic member comprises the leaf spring and a cam in which the first supporting portion is formed.

9. A power steering apparatus comprising an input shaft adapted to be connected to a steering wheel, an output shaft adapted to be connected to wheels, a torsion bar connecting said input shaft and said output shaft, said input shaft and said output shaft being rotatable relative to each other while twisting said torsion bar so as to apply an assist force corresponding to an amount of the relative rotation, a pair of spring members disposed in said output shaft or a member rotating integrally with said output shaft so as to sandwich said input shaft, first supporting portions formed in said spring members, second supporting portions formed on an external circumference of said input shaft so as to oppose said first supporting portions when said input shaft and said output shaft are in neutral position, balls or rollers disposed between said first and second supporting portions which oppose each other, wherein when said input shaft and said output shaft are rotated relative to each other so that said balls or rollers are about to slip out of said first and second supporting portions, said balls or rollers roll and move between said first and second supporting portions while deflecting said spring members, said balls or rollers slipping out of said first and second supporting portions and rolling and moving between said spring members and the external circumference of said input shaft while deflecting said spring members, and a pair of stoppers formed on each of said spring members such that when said input shaft and said output shaft are rotated by a predetermined amount relative to each other, said balls or rollers make contact with said stoppers.

10. A power steering apparatus according to claim 9, wherein each of said spring members is formed of a leaf spring comprising a first supporting portion of V-shaped groove or U-shaped groove, a pair of flat portions or slope portions continuous with said first supporting portion, a pair of convex portions continuous with ends of the flat portions or slope portions, a pair of supporting leg portions continuous with the convex portions, and a pair of hooking portions continuous with ends of the supporting leg portions, wherein said balls or rollers slipping out of said first and second supporting portions roll and move between the flat portions or the slope portions and the external circumference of said input shaft while deflecting said leaf spring.

11. A power steering apparatus according to claim 10, wherein a spring storing chamber is provided in said output shaft or a member rotating integrally with said output shaft and said leaf springs are stored in said spring storing chamber and secured therein by making the hooking portions thereof in firm contact with wall faces.

12. A power steering apparatus according to claim 9, wherein each of said spring members is formed of a leaf spring comprising a pair of slope portions continuous while forming a valley portion, a pair of convex portions continuous with ends of said slope portions, a pair of supporting leg portions continuous with said convex portions, and a pair of hooking portions continuous with ends of said supporting leg portions, wherein said valley portion acts as a first supporting portion and said balls or rollers slipping out of said first and second supporting portions roll and move between the slope portions and the external circumference of said input shaft while deflecting said leaf spring.

13. A power steering apparatus according to claim 12, wherein a spring storing chamber is provided in said output shaft or a member rotating integrally with said output shaft and said leaf springs are stored in said spring storing chamber and secured therein by making the hooking portions thereof in firm contact with wall faces.

14. A power steering apparatus according to claim 9, wherein said spring members are sheet-shaped elastic members and fixing portions are provided on both ends of said sheet-shaped elastic members and said fixing portions are fixed to said output shaft or a member rotating integrally with said output shaft by fixing means the position of which is not changed.

15. A power steering apparatus according to claim 14, wherein said sheet-shaped elastic members each comprise a leaf spring and a cam in which said first supporting portion is formed.

16. A power steering apparatus comprising
an input shaft adapted to be connected to a steering wheel,
an output shaft adapted to be connected to wheels,
a torsion bar connecting said input shaft and said output shaft, said input shaft and said output shaft being rotatable relative to each other while twisting said torsion bar so as to apply an assist force corresponding to an amount of the relative rotation,
a pair of spring members disposed in said output shaft or a member rotating integrally with said output shaft so as to sandwich said input shaft,
first supporting portions formed in said spring members,
second supporting portions formed on an external circumference of said input shaft so as to oppose said first supporting portions when said input shaft and said output shaft are in neutral position, and
balls or rollers disposed between said first and second supporting portions which oppose each other, wherein when said input shaft and said output shaft are rotated relative to each other so that said balls or rollers are about to slip out of said first and second supporting portions, said balls or rollers roll and move between said first and second supporting portions while deflecting said spring members,
each of said spring members being formed of a leaf spring comprising
a first supporting portion of V-shaped groove or U-shaped groove,
a pair of flat portions or slope portions continuous with said first supporting portion,
a pair of convex portions continuous with ends of the flat portions or slope portions,
a pair of supporting leg portions continuous with the convex portions, and
a pair of hooking portions continuous with ends of the supporting leg portions,
wherein the balls or rollers slipping out of said first and second supporting portions roll and move between the flat portions or the slope portions and the external circumference of said input shaft while deflecting said leaf spring.

17. A power steering apparatus according to claim 16, wherein a spring storing chamber is provided in said output shaft or a member rotating integrally with said output shaft and said leaf springs are stored in said spring storing chamber and secured therein by making the hooking portions thereof in firm contact with wall faces.

18. A power steering apparatus comprising
an input shaft adapted to be connected to a steering wheel,
an output shaft adapted to be connected to wheels,
a torsion bar connecting said input shaft and said output shaft, said input shaft and said output shaft being rotatable relative to each other while twisting said torsion bar so as to apply an assist force corresponding to an amount of the relative rotation,
a pair of spring members disposed in said output shaft or a member rotating integrally with said output shaft so as to sandwich said input shaft,
first supporting portions formed in said spring members,
second supporting portions formed on an external circumference of said input shaft so as to oppose said first supporting portions when said input shaft and said output shaft are in neutral position, and
balls or rollers disposed between said first and second supporting portions which oppose each other, wherein when said input shaft and said output shaft are rotated relative to each other so that said balls or rollers are about to slip out of said first and second supporting portions, said balls or rollers roll and move between said first and second supporting portions while deflecting said spring members,
each of said spring members being formed of a leaf spring comprising
a pair of slope portions continuous while forming a valley portion,
a pair of convex portions continuous with ends of said slope portions,
a pair of supporting leg portions continuous with said convex portions, and
a pair of hooking portions continuous with ends of said supporting leg portions,
wherein said valley portion acts as a first supporting portion and said balls or rollers slipping out of said first and second supporting portions roll and move between the slope portions and the external circumference of said input shaft while deflecting said leaf spring.

19. A power steering apparatus according to claim 18, wherein a spring storing chamber is provided in said output shaft or a member rotating integrally with said output shaft and said leaf springs are stored in said spring storing chamber and secured therein by making the hooking portions thereof in firm contact with wall faces.

20. A power steering apparatus comprising
an input shaft adapted to be connected to a steering wheel,
an output shaft adapted to be connected to wheels,
a torsion bar connecting said input shaft and said output shaft, said input shaft and said output shaft being rotatable relative to each other while twisting said torsion bar so as to apply an assist force corresponding to an amount of the relative rotation,
a pair of spring members disposed in said output shaft or a member rotating integrally with said output shaft so as to sandwich said input shaft,
first supporting portions formed in said spring members, second supporting portions formed on an external circumference of said input shaft so as to oppose said first supporting portions when said input shaft and said output shaft are in neutral position, balls or rollers disposed between said first and second supporting portions which oppose each other, wherein when said input shaft and said output shaft are rotated relative to each other so that said balls or rollers are about to slip out of said first and second supporting portions, said balls or rollers roll and move between said first and second supporting portions while deflecting said spring members, said spring members being sheet-shaped elastic members, wherein fixing portions are provided on both ends of said sheet-shaped elastic members and said fixing portions are fixed to said output shaft or a member rotating integrally with said output shaft by fixing means the position of which is not changed.

21. A power steering apparatus according to claim 20, wherein each of said sheet-shaped elastic members comprises a leaf spring and a cam in which said first supporting portion is formed.

* * * * *